(12) United States Patent
Chau

(10) Patent No.: US 10,104,002 B2
(45) Date of Patent: Oct. 16, 2018

(54) METHOD AND SYSTEM FOR NETWORK ADDRESS RE-USE IN NETWORK ADDRESS TRANSLATION

(71) Applicant: Cisco Technology, Inc., San Jose, CA (US)

(72) Inventor: Hung The Chau, Highland, CA (US)

(73) Assignee: Cisco Technology, Inc., San Jose, CA (US)

( * ) Notice: Subject to any disclaimer, the term of this patent is extended or adjusted under 35 U.S.C. 154(b) by 206 days.

(21) Appl. No.: 15/074,324

(22) Filed: Mar. 18, 2016

(65) Prior Publication Data
US 2017/0272373 A1     Sep. 21, 2017

(51) Int. Cl.
*H04L 12/721* (2013.01)
*H04L 12/801* (2013.01)

(52) U.S. Cl.
CPC .............. *H04L 47/34* (2013.01); *H04L 45/72* (2013.01)

(58) Field of Classification Search
CPC ................................ H04L 45/72; H04L 47/34
See application file for complete search history.

(56) References Cited

U.S. PATENT DOCUMENTS

| | | | | | |
|---|---|---|---|---|---|
| 6,157,955 | A | * | 12/2000 | Narad | ...................... H04L 45/16 709/228 |
| 2008/0304483 | A1 | * | 12/2008 | Williams | .............. H04L 1/0041 370/389 |
| 2014/0269722 | A1 | * | 9/2014 | Uchida | ............... H04L 45/7453 370/392 |
| 2017/0085500 | A1 | * | 3/2017 | Patney | ..................... H04L 49/25 |
| 2017/0373973 | A1 | * | 12/2017 | Bickhart | ............... H04L 45/741 |

OTHER PUBLICATIONS

Platts, Michael. "How TCP TIME-WAIT Assassination Works," https://blogs.technet.microsoft.com/networking/2010/08/11/how-tcp-time-wait-assassination-works/, Aug. 11, 2010.
(Continued)

*Primary Examiner* — Kashif Siddiqui
(74) *Attorney, Agent, or Firm* — Campbell Stephenson LLP

(57) ABSTRACT

In one embodiment, a method is described. The method includes receiving a network communication from a source device (where the network communication is received at a network device, and the network communication comprises a sequence number) and determining whether the sequence number is to be modified. In response to a determination that the sequence number is to be modified, the method further includes extracting the sequence number from the network communication, modifying (by a processor of the network device) the sequence number to produce a modified sequence number, and inserting the modified sequence number in the network communication, in place of the sequence number, to produce a modified network communication. Further still, the method includes transmitting the modified network communication to a destination device, where the network communication is transmitted from the network device.

20 Claims, 12 Drawing Sheets

(56) References Cited

OTHER PUBLICATIONS

Len. "TIME_WAIT and its design implications for protocols and scalable client server systems," http://www.serverframework.com/asynchronousevents/2011/01/time-wait-and-its-design-implications-for-protocols-and-scalable-servers.html, Jan. 21, 2011.
Antoniou, Stelios. "Scaling IP Addresses with NAT (Network Address Translation) and PAT (Port Address Translation)," https://www.pluralsight.com/blog/software-development/nat-network-address-translation-pat-port-address-translation, Sep. 13, 2007.
Davis, David. "Set up Port Address Translation (PAT) in the Cisco IOS," http://www.techrepublic.com/article/set-up-port-address-translation-pat-in-the-cisco-ios/, May 14, 2002.
Kadam, B.M., "How to Translate Inside Local and Inside Global Address by NAT," https://badrinathkadam.wordpress.com/2012/03/27/how-to-translate-inside-local-and-inside-global-address-by-nat/, Mar. 27, 2012.

\* cited by examiner 0 to $(2^{32} - 1)$ → 0 to 4,294,967,295

$(2^{32} - 1 = 4,294,967,295)$

CURRENT_SEQ_NUM to $\pm(2^{31} - 1)$ →
　　　　　　　　CURRENT_SEQ_NUM to ±2,147,483,647

$(2^{31} - 1 = 2,147,483,647)$

METHOD AND SYSTEM FOR NETWORK ADDRESS RE-USE IN NETWORK ADDRESS TRANSLATION

FIELD OF THE INVENTION

The present disclosure relates generally to network communications, and more particularly to re-use of network addresses in network devices that perform network address translation.

BACKGROUND

Communication networks allow network clients, such as computer systems, to exchange data with each other at ever-increasing speeds. Communication protocols define the techniques and formats that such devices use when exchanging data via the communication networks. Communication networks connect the devices over various media, such as optical, electrical, or wireless media, and/or a combination thereof. Further, such a network can include network devices that facilitate such communication. These network devices (such as switches, routers, and the like) provide, for example, routing functionality that can route data (e.g., carried in packets, frames, or the like) from one point in the communications network to another, possibly within a larger communication network.

Often, devices in one portion of a network (e.g., a sub-network) will use a different addressing scheme (e.g., a private or a non-routable addressing scheme) from that used by another portion of the network (e.g., a wide area network (WAN) such as the Internet). In order for a device in such a sub-network to communicate data with a device in another sub-network, an address translation is typically performed. A network address translation (NAT) device typically performs such network address translations. Thus, a device in a sub-network typically sends a network communication to an NAT device, which performs network address translation, and then forwards this network communication using a different network address to a device in another sub-network.

NAT devices can be used, for example, to translate network addresses of a network communication received from (or destined for) devices in an internal network (e.g., an intranet) to network addresses that are used by an external network. In a similar fashion, the network addresses of multiple network devices in an internal network can be translated to a single external network address by translating the given internal network addresses to corresponding sub-addresses of the single external network address (e.g., by translating a number of internetwork protocol (IP) addresses (as well as ports thereof) in the internal network to ports on a given external IP address). In an IP addressing environment (e.g., one in which the Open Systems Interconnection (OSI) model is employed), such address translation techniques are known as port address translation (PAT) techniques. This translating between multiple internal network addresses and a single external network address is, in some networking models, referred to as network address "overloading."

BRIEF DESCRIPTION OF THE DRAWINGS

The present disclosure may be better understood, and its numerous objects, features, and advantages made apparent to those skilled in the art by referencing the accompanying drawings.

Figure 1:
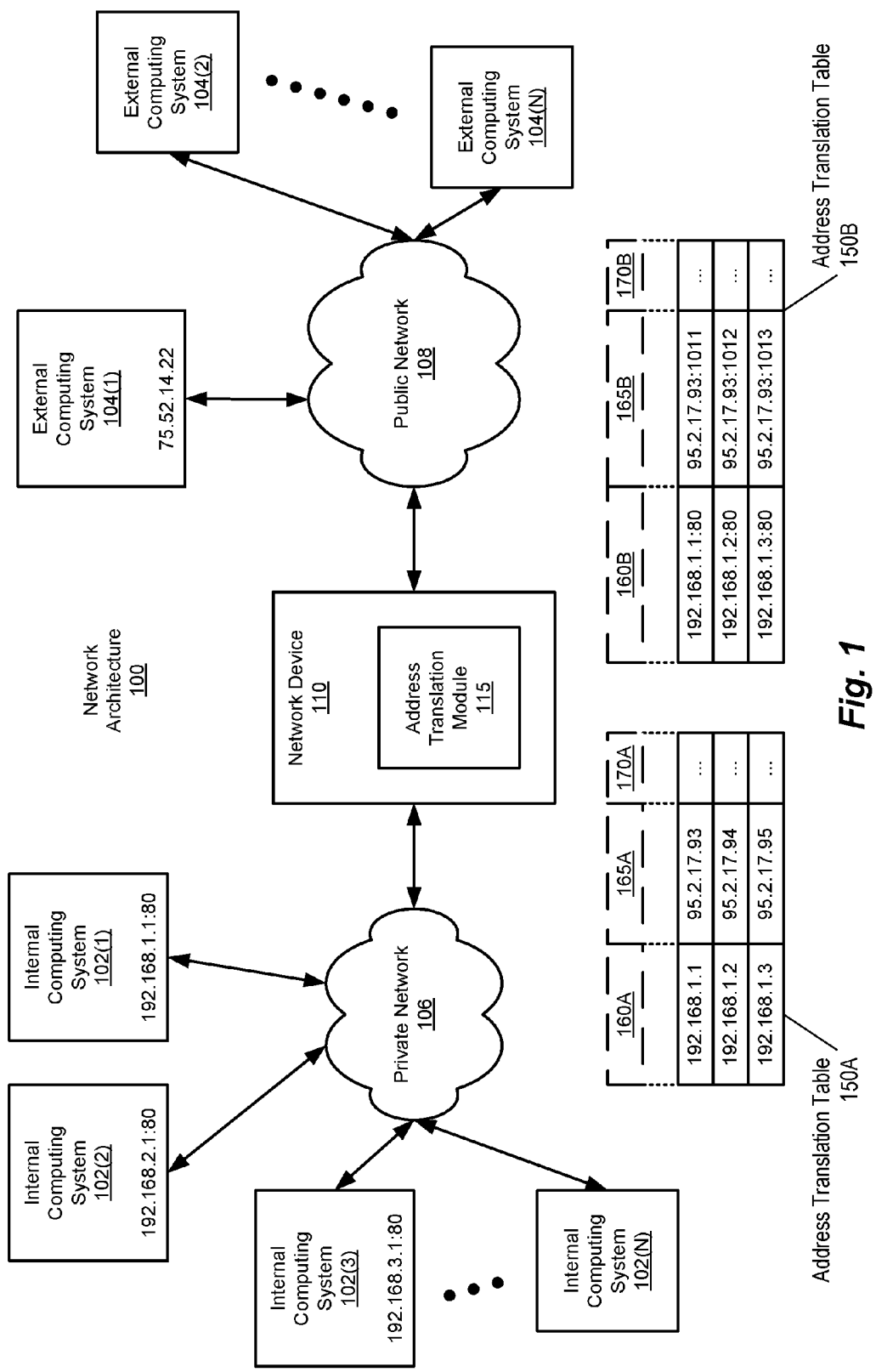
FIG. 1 is a block diagram illustrating an example of a simplified network architecture, according to one embodiment.

While embodiments such as those presented in the application are susceptible to various modifications and alternative forms, specific embodiments are provided as examples in the drawings and description of example embodiments. It should be understood that the drawings and description of example embodiments are not intended to limit the embodiments to the particular form disclosed. Instead, the intention is to cover all modifications, equivalents and alternatives falling within the spirit and scope of methods and systems such as those described herein, as defined by the appended claims.

DESCRIPTION OF EXAMPLE EMBODIMENTS

Overview

Methods and network devices are disclosed that support the re-use of network addresses in network devices that perform network address translation. In one embodiment, a method therefor includes receiving a network communication from a source device (where the network communication is received at a network device, and the network communication comprises a sequence number) and determining whether the sequence number is to be modified. In response to a determination that the sequence number is to be modified, the method further includes extracting the sequence number from the network communication, modifying (by a processor of the network device) the sequence number to produce a modified sequence number, and inserting the modified sequence number in the network communication, in place of the sequence number, to produce a modified network communication. Further still, the method includes transmitting the modified network communication to a destination device, where the network communication is transmitted from the network device.

EXAMPLE EMBODIMENTS

Certain network architectures support network communications between multiple computing and/or network devices in one network segment and one or more computing and/or network devices in another network segment. In certain of these network architectures, network communications from (and to) the multiple computing and/or network devices in the one network segment are sent (and received) using a single network address in the address space of the other network. This can be accomplished by using network sub-addresses of the single network address. Further such a network address and network sub-addresses can be re-used, as between the multiple computing and/or network devices in the one network segment, such that when one such computing and/or network device is finished using the network address/sub-address, another of the computing and/or network devices in the one network can use that network address/sub-address.

It will be further appreciated that certain networking protocols send information in units of network communications such as packets, frames, and the like. In order to keep track of such network communications, these networking protocols employ sequence numbers, which are included in the network communications. Through their use of such sequence numbers, computing and/or network devices participating in such network communications are able to accomplish tasks such as maintaining the proper order of such network communications, determine if one or more network communications have been lost or damaged in transit, request retransmission of one or more network communications, and perform other such operations as may be advantageous to the network communications taking place.

However, while the use of sequence numbers in network communications provides a number of benefits, problems can arise in environments in which sequence numbers are used in networks where network addresses (and/or network sub-addresses) are re-used. For example, errors in network communications in such network architectures can result from sequence number "aliasing," where network communications using a re-used network address/sub-address accidentally use sequence numbers recently used in the network communications used by an earlier network communication. In such an instance, it is possible for the computing/network device receiving a network communication from the earlier exchange to be mistaken for a network communication of the present network communications. Clearly, the receipt of such erroneous network communications by a computing/network device are likely to cause errors and malfunctions in the receiving computing/network device. At a minimum, such errors are likely to cause the need for retransmission of network communications, additional resource utilization, and other overhead in the source device(s) and destination device(s) involved.

As will be appreciated in light of the present disclosure, a determination can be made as to the source of the network communication, and in so doing, avoid erroneous ("stale") network communications from destinations with which the given computing/network device is not in communication.

Further, the re-use of a given network address/sub-address can be delayed, and in so doing, the possibility of receiving such "stale" network communications reduced. Unfortunately, while a longer delay can reduce the likelihood of sequence number aliasing, such longer delays also reduce the number of available network addresses/sub-addresses available for re-use, thus reducing the overall bandwidth available. A better solution, and one that permits the immediate re-use of network addresses/sub-addresses, is to actively manage sequence numbers through sequence number information processing, and so avoid the aforementioned delays, thereby increasing overall available bandwidth and improving resource utilization and throughput.

FIG. 1 is a block diagram illustrating an example of a simplified network architecture, according to one embodiment. To this end, FIG. 1 depicts a network architecture 100, which supports network communications between a number of internal computing systems (depicted in FIG. 1 as internal computing systems 102(1)-(N), collectively, internal computing systems 102) and a number of external computing systems (depicted in FIG. 1 as external computing systems 104(1)-104(N), collectively, external computing systems 104). Each of internal computing systems 102 can be, for example, a computing device such as a computer system, mobile computing device (e.g., smartphone, tablet or the like), or other such device, which is designed to communicate data with other such clients and/or external computing systems. Each of external computing systems 104 can be, for example, a server system of some sort (e.g., a web server, database server, or other such source of information or service). Internal computing systems 102 communicate with one another via a private network 106. Private network 106 can be implemented, for example, as an intranet (e.g., a private Internet Protocol network (IP network; such as is defined in, for example, Postel, J., "Internet Protocol", STD 5, RFC 791, DOI 10.17487/RFC0791, September 1981)). Similarly, external computing systems 104 communicate with one another (and can be communicated with) via a public network 108.

Internal computing systems 102 in private network 106 are not directly connected to external computing devices 104 in public network 108. Rather, network communications between such devices (e.g., internal computing systems 102 in private network 106 and external computing systems 104 in public network 108) are conveyed by a network device 110 (e.g., a router or other such network device). More particularly, network device 110 supports and facilitates network communications (e.g., the conveyance of data and control information by way of packets, frames, or other such units of communication) between private network 106 and public network 108, among other such functions, via one or more network interfaces (not shown).

In one implementation, internal computing systems 102 in private network 106 are addressable using private network addresses. Private network addresses are network addresses that are not routable as between private network 104 and public network 108. In other words, a private network address cannot be properly interpreted by devices in public network 108. Instead, network communications between internal computing systems 102 and external computing systems 104 are facilitated by an address translation module. Thus, in certain embodiments, network device includes such an address translation module (depicted in FIG. 1 as an address translation module 115), which facilitates communication of data between multiple computing devices and/or network devices in network segments employing different network address schemes. Such an address translation module can be implemented using network devices such as switches or routers, and so can be a part of a network that includes multiple networks, sub-networks, and/or other network segments, where each such network segment can use a different addressing scheme. The address translation module translates the network addresses of network packets that originate in one network segment, to network addressing schemes used by another network segment.

Address translation module 115 provides for two-way networks communications, and so provides for translation between internal network addresses and external network addresses. That being the case, address translation module 115, upon receiving a network communication from one of internal computing devices 102, translates the network address in the network communication (a network address in the address space of private network 106 (e.g., an intranet)) to one or more external addresses that are addressable by external computing devices 104 in public network 108 (e.g., the Internet). Conversely, external computing devices 104 are send network communications intended for computing devices in private network 106 using the external network address, which is addressable in the address space of the external network. Upon receiving this network communication, address translation module 115 translates the external network address to the internal network address of the intended internal computing device. Examples of the manner in which address translation module 115 performs such translations are described subsequently, in connection with others of the figures.

As will be appreciated in light of the present disclosure, an address translation module such that described herein translates internal network addresses (e.g., as might be used by computing devices in private network 106 (e.g., an intranet)) to external network addresses (e.g., as might be used by computing devices in public network 108 (e.g., the Internet)). Some portion of a given network communication from a client device in the first network segment is processed by the address translation module, resulting in the network communication is in a form appropriate for conveyance in the second network segment. Furthermore, the client devices typically use an internal addressing scheme that is only common to that first network, i.e., the internal addressing scheme cannot be used (i.e., is not properly addressable) outside of the first network. As will be further appreciated, other scenarios are possible. For example, instead of being a part of such a private network, internal computing systems 102 might simply be addressable from external devices in network 108 using another addressing scheme. In such implementations, network 108 can be implemented as simply another intranet or another type of a private network, among other such alternatives. In yet another variation, private network 106 and public network 108 can both be private networks. In such an implementation, private network 106 and public network 108 would implement nested private network address spaces.

For example, such internal network addresses might conform to a first network protocol (such as Internet Protocol version 4 (IPv4; such as is defined in, for example, Postel, J., "Internet Protocol", STD 5, RFC 791, DOI 10.17487/RFC0791, September 1981)). Conversely, external network addresses might conform to a second network protocol (such as Internet Protocol version 6 (IPv6; such as is defined in, for example, Deering, S. and R. Hinden, "Internet Protocol, Version 6 (IPv6) Specification", RFC 2460, DOI 10.17487/RFC2460, December 1998)). Such network protocols define, among other things, the manner in which network packets are addressed. For example, network addresses that conform to the IPv4 standard use a 32-bit address, while network addresses that conform to the IPv6 standard use a 128-bit address. It is noted that in one implementation, the external network addresses may (also) conform to the same network protocol as that used in the internal network; however, the internal network addresses of the first network protocol may still not be addressable outside of the internal network (e.g., in the case in which the same network address is used in both the internal and external networks). Furthermore, the network communications supported can include information associated with link, transport, and application layers, which are not shown in the figures for ease of explanation. In some implementations, portions of the address/destination addresses can be stored using header/data of another network layer, such as using the transport layer (e.g., one of a transmission control protocol (TCP; such as is defined in, for example, Postel, J., "Transmission Control Protocol", STD 7, RFC 793, DOI 10.17487/RFC0793, September 1981) or user datagram protocol (UDP; such as is defined in, for example, Postel, J., "User Datagram Protocol", STD 6, RFC 768, DOI 10.17487/RFC0768, August 1980). For example, for IPv4 network packets, the port portions of the destination and/or source addresses can be encoded using the transport layer, since the IP layer (as implemented using IPv4) does not have enough space to carry the port number. However, other implementations of encoding the port numbers in network packets are contemplated, such as using other fields in the IP header (or the header fields of other protocol layers) to carry this information.

One reason for using a private network is to allow companies, organizations, or other entities to use IP addresses that would otherwise be assigned to other such entities. In the case of IPv4 network address space, there is now a shortage of IPv4 network addresses that are available for new network devices. Put another way, the shortage of IP addresses under the IPv4 addressing scheme means that there are not enough IPv4 network addresses that can be assigned to each network device. Another reason for using private networks is to isolate entity's network devices (i.e., internal computing systems 102) from computing and network devices outside the private network (e.g., computing or network devices connected to other network segments of the Internet). As a result, network devices within the private network are not directly addressable by network devices outside of the private network (e.g., outside of a company's intranet).

Network device 110 thus provides address translation mechanisms, among other such mechanisms and functionalities, that translate between the network address space of private network 106, and that of public network 108. To this end, in the example of network architecture 100, network device 110 provides such functionality by way of address translation module 115, which translates between the network address spaces of private network 106 and public network 108. In turn, address translation module 115 includes mechanisms that support address translation (both network address translation (NAT) and port address translation (PAT)), and particularly, in embodiments of methods and systems such as those described herein, network translation mechanisms that provide for sequence information processing according to such embodiments. To this end, in the example of network architecture 100, address translation module 115 can maintain one or more address translation tables (examples of which are depicted in FIG. 1 as address translation tables 150A and 150B). Thus, address translation module 115 also provides for such sequence information processing by including mechanisms that determine whether network address re-use has occurred (e.g., as part of network address translation) and, if so, the appropriate sequence information processing to be performed. In performing such sequence information processing, address translation module 115 extracts a sequence number from an outbound network communication that has been received from a source device (e.g., one of internal computing systems 102 in private network 106), modifies the sequence number accordingly (thus producing a modified sequence number that will prevent (or at least, reduce the likelihood of) errors such as connections failures or the like), and inserts the modified sequence number into the outbound network communication (thus producing a modified network communication). This modified network communication, now containing the requisite translated network addresses and modified sequence number, can then be transmitted to, for example, a destination device (e.g., external computing system 104(1) in public network 108).

In certain networking architectures, then, an address translation module such as address translation module 115 employs a network address translation (NAT) scheme referred to as port address translation (PAT). Address translation tables 150A and 150B provide examples of address translation tables used in such networking schemes (with address translation table 150A being that appropriate for use in a NAT scheme, and address translation table 150B being that appropriate for use in a PAT scheme). As will be appreciated, the example of network architecture 100 depicts network addresses as might be used in, for example, a transmission control protocol (TCP)/internet protocol (IP) network environment.

In such embodiments (e.g., TCP/IP), four address types can be employed:

Inside local address—a network address that is simply the private IP address assigned to a computing device within the internal network.

Inside global address—a network address that is the IP address provided as a result of the translation process in network device 110, which represents the internal (local) address or range of internal (local) addresses.

Outside local address—If employed, an outside local address is the IP address known locally to the internal network, when a translation to an outside global address is performed. For example, while a network communication (e.g., a packet) traverses through the Internet to its final destination, such a packet may encounter another translation. The IP address prior to such a translation is referred to as an outside local address, since that address belongs to an external network, but is the network address known locally to the internal network.

Outside global address—a network address that is the IP address assigned to a host in the external network by the host owner (e.g., in the case of a network address translation, the network address assigned as a result of translation), which lies in a globally-routable range of network addresses (a network address range).

The foregoing network address types are discussed in further detail subsequently, in connection with FIG. 2.

For completeness, it will be appreciated that, in certain embodiments, NAT can be configured in one or more of the following manners:

Static NAT: Provides one-to-one mapping between local and global addresses, consequently, every computer on the network must be allocated a single dedicated routable IP address.

Dynamic NAT: A pool of routable IP addresses is configured on network device 110 (e.g., a router) and, dynamically, network device 110 assigns network addresses from this pool to every device that requires sending traffic to the external network. This type of NAT involves thoughtful planning, so that the pool of IP addresses is sufficient to support the traffic needs of the internal network during peak usage.

Port address translation (PAT): Another variation of NAT, PAT can also be styled as "address overloading" (or more simply "overloading") because the approach is designed to translate multiple private IP addresses to just a single registered IP address (the overloaded address) by applying different port addresses in the transmission control protocol (TCP) or user datagram protocol (UDP) header, for example. Such overloading can see hundreds or thousands of clients overloaded onto a single IP address.

Address translation tables 150A and 150B provide examples of network address translations used in such network address translation schemes. To this end, address translation table 150A includes an internal address field 160A, an external address field 165A, and a network connection information field 170A. As can be seen, address translation table 150A is configured to facilitate a NAT scheme, in which internal network addresses (e.g., internal IP addresses 192.168.1.1, 192.168.1.2, and 192.168.1.3) are translated to corresponding external network addresses (e.g., external IP addresses 95.2.17.93, 95.2.17.94, and 95.2.17.95, respectively), on a 1:1 basis. Network connection information field 170A provides for the maintenance of network connection information such as protocol type (e.g., TCP, UDP, and/or other such network protocols), additional network address information, and/or other such network connection information, as well as sequence number information (described subsequently in connection with the remaining figures).

Similarly, address translation table 150B includes an internal address field 160B, an external address field 165B, and a network connection information field 170B. As can be seen, address translation table 150B is configured to facilitate a PAT scheme, in which multiple internal network addresses (e.g., internal IP addresses:ports 192.168.1.1:80, 192.168.1.2:80, and 192.168.1.3:80, which can include the port number in question, as appropriate) are translated to a single external network address, but multiple port numbers (e.g., external IP address:ports 95.2.17.93:1011, 95.2.17.93:1012, and 95.2.17.93:1013, respectively), on an N:1 basis, using the aforementioned technique of port overloading. As before, network connection information field 170B provides for the maintenance of network connection information such as protocol type (e.g., TCP, UDP, and/or other such network protocols), additional network address information, and/or other such network connection information, as well as sequence number information (described subsequently, as noted, in connection with the remaining figures). As will thus be appreciated, then, address translation module 115 is also capable of performing sequence number processing, such as that described subsequently, in order to allow immediate re-use of overloaded external network addresses.

Figure 2:
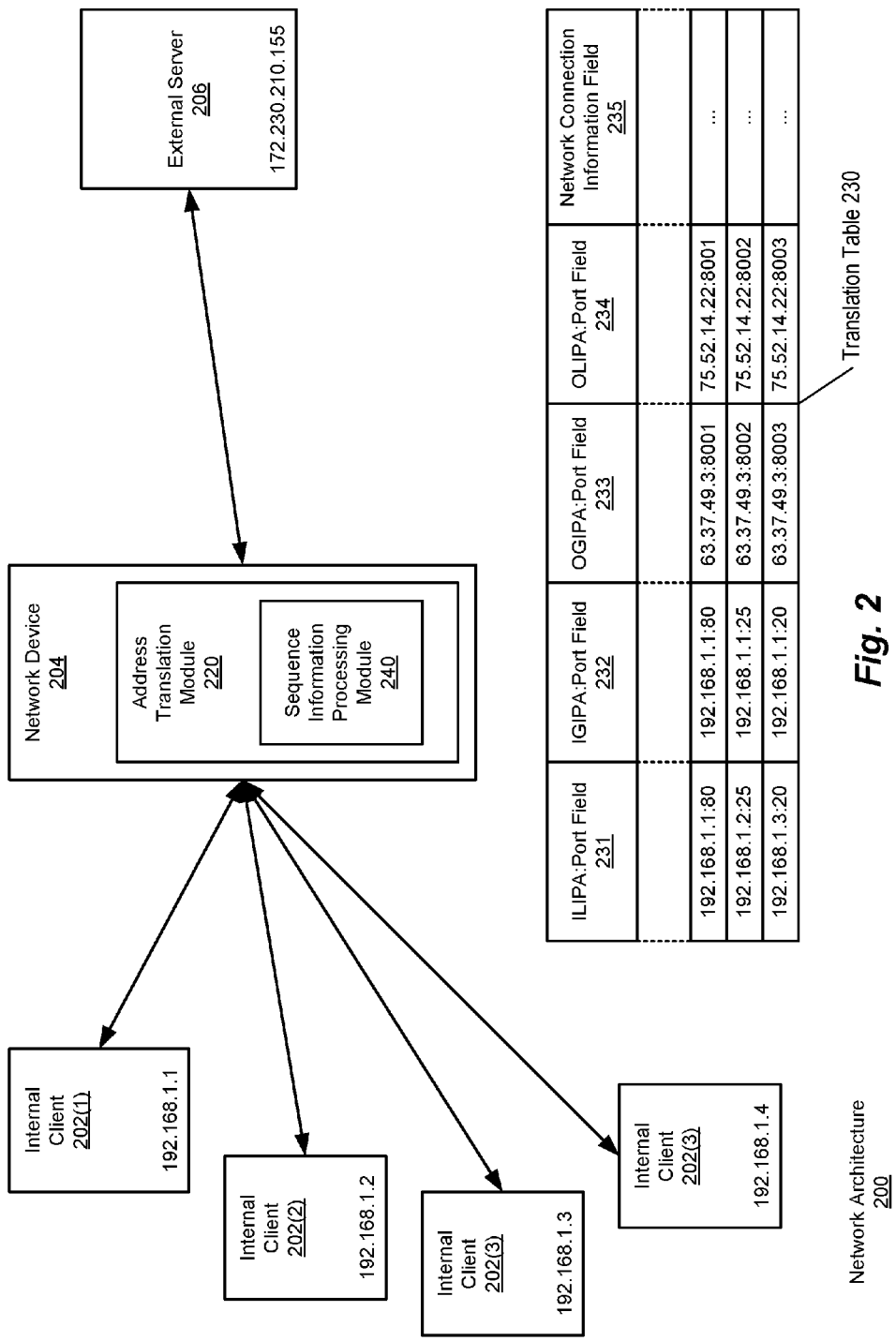
FIG. 2 is a block diagram illustrating an example of a simplified network architecture, according to one embodiment.

FIG. 2 is a block diagram illustrating an example of a simplified network architecture, according to one embodiment. FIG. 2 also illustrates example network communications in that simplified network architecture (depicted in FIG. 2 as a network architecture 200), between one or more internal computing systems and an external computing system. Network architecture 200 thus includes a number of internal computing systems (depicted in FIG. 2 as internal clients 202(1)-(4), collectively, internal clients 202) that are communicatively coupled to a network device 204. Network architecture 200 also includes an external server 206 that is communicatively coupled to network device 204. Internal clients 202 are not directly addressable by an external computing device (depicted in FIG. 2 as an external server 206). In other words, external server 206 cannot send a network communication (e.g., a packet) that is directly addressed to one of internal clients 202. However, depending on the implementation, internal clients 202 may be able to send a network packet that is directly addressed to external server 206. Each of internal clients 202 and external server 206 can be, for example, a computing device, such as a computer, mobile computing device. or the like, that is configured to communicate data with other computing devices.

In the manner of network device 110, network device 204 includes an address translation module (depicted in FIG. 2 as an address translation module 220). In a manner comparable to that of address translation module 115, address translation module 220 translates network addresses used in an internal network (e.g., as by internal clients 202) and those used in an external network (e.g., as by external server 206). The addresses used by each of these network segments are referred to herein as an internal address space and an external address space. As depicted in FIG. 2, address translation module 220 translates between internal and external network addresses, at least in part, by way of a translation table 230. It will be appreciated that, while address translation module 220 is shown as being implemented as part of network device 204, address translation module 220 can be implemented as a standalone device, or as a part of another client or server, in other embodiments.

As part of the operation of address translation module 220, address translation module 220 maintains network address and other associated information in translation table 230. Translation table 230 supports both NAT and PAT functionalities, and so includes a number of fields, examples of which include an inside local internet protocol (IP) address and port (ILIPA:Port) field 231, an inside global IP address and port (IGIPA:Port) field 232, an outside global IP address and port (OGIPA:Port) field 233, an outside local IP address and Port (OLIPA:Port) field 234, and a connection information field 235. As noted earlier in connection with FIG. 1, each of these fields is configured to store network addresses within a given address space (e.g., an internal address space, an external address space, or the like). Thus:

In such embodiments (e.g., TCP/IP), address types such as those described earlier can be employed:

ILIPA:Port field 231 corresponds to an inside local address that is the private IP address of an internal client.

IGIPA:Port field 232 corresponds to an inside global address that is the IP address provided as a result of the network address translation process, which represents the internal (local) address or range of internal (local) addresses (the internal network address range).

OGIPA:Port field 233 corresponds to an outside global address that is the IP address assigned to a host in the external network by the host owner, and lies in a globally-routable range of network addresses (the external network address range). Also referred to in the generic herein as an external network source address.

OLIPA:Port field 234 corresponds to an outside local address that is the IP address known locally to the internal network, when a translation to an outside global address is performed.

Lastly, translation table 230 also provides connection information field 235 for the maintenance of network connection information such as protocol type (e.g., TCP, UDP, and/or other such network protocols), additional network address information (e.g., an external network destination address, in the generic, the network address of the destination of network communications communicated on the given network connection), and/or other such network connection information, as well as sequence number information. To this end, address translation module 220 includes, among other possible elements, a sequence information processing module 240.

Sequence information processing module 240 processes sequence number information that includes the sequence numbers that are used to sequence units of data within network communications. Using a packet conforming to the TCP/IP protocol suite as an example, the process of connection establishment using TCP's three-way handshake procedure, which proceeds as follow. Before one computing device (e.g., an internal computing device such as a client) attempts to connect with another computing device (e.g., an external computing device such as a server), the server first binds to and listens at a port to open the port for connections: this is referred to as a passive open. Once the passive open is established, a client may initiate an active open. To establish a connection, the three-way (or 3-step) handshake is performed:

SYN: The active open is performed by the client sending a SYN packet to the server. In certain embodiments, the client sets the packet's sequence number to a random value A.

SYN-ACK: In response, the server replies with a SYN-ACK packet. The acknowledgment number is set to one more than the received sequence number (A+1), and the sequence number that the server chooses for the packet is another random number, B.

ACK: Finally, the client sends an ACK back to the server. The sequence number is set to the received acknowledgement value (A+1), and the acknowledgement number is set to one more than the received sequence number (B+1).

At this point, both the client and server have received an acknowledgment of the connection. The first and second steps establish the connection parameter (sequence number) for one direction (including its acknowledgement). The second and third steps establish the connection parameter (sequence number) for the other direction (including its acknowledgement). With these, a full-duplex communication is established.

As will be appreciated in light of the present disclosure, when a computing device in an internal network (e.g., one of internal clients 202, such as internal client 202(1) at 192.168.1.10) sends its first packet to a computing device in an external network (e.g., external server 206), as by way of a TCP SYN or UDP segment, address translation module 220 replaces the source's inside local IP address (also referred to generically herein as an internal source network address, as stored in ILIPA:Port field 231) in the IP header of the packet with a single outside global IP address (as stored in OGIPA:Port field 233). As will also be appreciated, IGIPA:Port field 232 is used to maintain information regarding the internal network address (and, potentially, port) of the internal network address of network device 204, which is within the internal address range, while, if external network address translation is employed, OLIPA:Port field 234 is used to maintain information regarding the external network address (and, potentially, port) known locally to the internal network, when a translation to an outside global address is performed.

As can be seen, when implementing a PAT scheme, address translation module 220 also assigns a port number to each outbound connection. The port number assigned can be selected from a pool of available port numbers for the given network address. Address translation module 220 then inserts the assigned port number into the TCP/UDP header source port of the given packet, and sends that packet into the external network. As part of this process, address translation module 220 makes an entry in translation table 230, which, as depicted in FIG. 2, contains the inside IP address and inside source port (e.g., 192.168.0.10:80, in ILIPA:Port field 231), the assigned outside IP address and port (e.g., 63.37.49.3:8001, in OGIPA:Port field 233), and additional information (e.g., the protocol used (e.g., TCP or UDP), external network destination address, sequence information, and other such information, in network connection information field 235). Subsequently, packets from the same network connection (e.g., TCP connection) on the inside IP address are translated to the same outside port number (and outside IP address).

Sequence information is maintained and processed by sequence information processing module 240. Such sequence numbers can serve a dual role. If the packet's "SYN flag" is set (indicating that sequence numbers are to be synchronized, as in the first SYN packet sent in a TCP/IP network connection), the sequence number contained in the packet's sequence number field is an initial sequence number. The sequence number of the actual first data byte and the acknowledged sequence number in the corresponding acknowledgement (ACK) are then set to this initial sequence number, plus 1. If the "SYN flag" is clear, the sequence number reflects the accumulated sequence number of the first data byte of the current data (in the packet), for the current network connection. The network communications continue in this manner, with sequences numbers sent back and forth reflecting the numbers of units of data sent in each direction.

As noted, if an outside network address is re-used, there is a possibility that sequence number aliasing will occur. For example, as depicted in FIG. 2, internal client 202(1) (192.168.1.1) is connected to external server 206 (172.230.210.155). If internal client 202(1) relinquishes 63.37.49.3:8001 as the result of some unforeseen event (e.g., internal client 202(1) crashes), re-use of 63.37.49.3:8001 by, for example, internal client 202(4) (192.168.1.4) is possible. Upon re-use, internal client 202(4) would proceed with the aforementioned three-way handshake sequence, and so initialize the sequence numbers in the aforementioned manner, in a network connection with external server 206. However, it is also possible that, in the interim, external server 206 has sent one or more packets intended for internal client 202(1) (at the network address 63.37.49.3:8001). Depending on the initial sequence number generated by internal client 202(4), receipt of the one or more (erroneous) packets can result in errors in network device 204 and/or internal client 202(4) (e.g., connection failure and/or the like).

One way to address the problem is to simply wait for a prescribed period, in order to reduce or eliminate (depending on the protocols, network architecture, and other factors involved) the possibility of such a situation. For example, again using a TCP/IP connection as an example, whenever a connection is terminated (whether gracefully or abnormally), either of the server or client can be designed to wait for a time period sufficient to reduce the probability of receiving such anomalous (or stale) packets to an acceptable level. In one embodiment, this involves waiting for enough time to pass to be sure the remote TCP received the acknowledgment of its connection termination request. This length of time, in a TCP/IP environment, is equal to twice the maximum segment lifetime (MSL), for which the server and/or client remains in a TIME_WAIT state. As noted, such an approach limits throughput of network device 204, as well as resulting in longer waits for network addresses and reduced bandwidth, as well as the memory such inactive "connections" consume in TIME_WAIT, among other such disadvantages. Embodiments such as those described herein, among other advantages, prevent connectivity failures in new network connections by avoiding such new network connections being aliased into a network connection in a TIME_WAIT state by altering the sequence numbers used in the new network connection. Detection of the potential for aliasing results in the ability to avoid such aliasing and provide improved performance.

To address these disadvantages, sequence information is maintained by sequence information processing module 240 in network connection information field 235 of translation table 230, which can include information regarding sequence numbers such as the last sequence number used in the network connection (referred to herein as LAST_SEQ_NUM, for example), the destination network address, and other such information. By maintaining such sequence information, sequence information processing module 240 is able to manage sequence numbers for the various network connections supported by network device 204, and avoid sequence number aliasing when re-using network addresses, allowing for the immediate re-use of network addresses upon termination of a given network connection. A more detailed description of an example of the manner in which sequence information processing module 240 can manage sequence numbers and other sequence information to support such approaches is now given in connection with FIG. 3.

Figure 3:
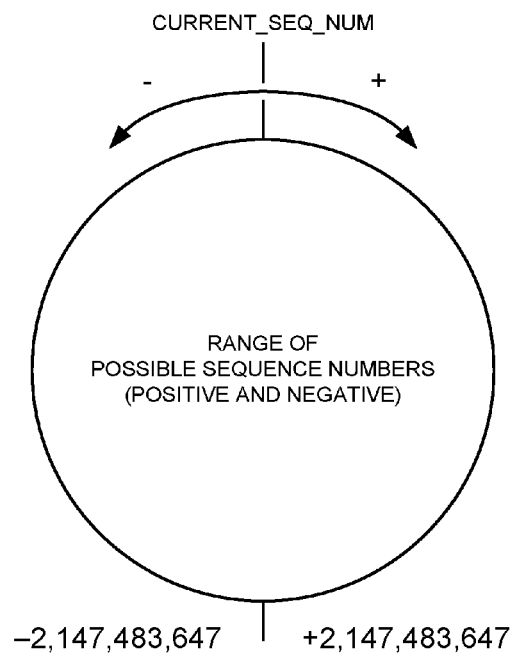
FIG. 3 is a block diagram illustrating an example of the range of sequence numbers, according to one embodiment.

FIG. 3 is a block diagram illustrating an example of sequence numbers, according to one embodiment. FIG. 3 illustrates an example of a range of sequence numbers possible in a sequence numbering system that employs sequences numbers that are 32 bits in length. As can be seen in FIG. 3, the maximum number of possible sequence numbers ranges from 0 to 4,294,967,295 (or $2^{32}-1$). However, in embodiments such as those described herein, a current sequence number (CURRENT_SEQ_NUM) can range in the positive or negative direction by an amount equal to $\pm(2^{31}-1)$, or sequence numbers ranging from −2,147,483,647 to +2,147,483,647. In so doing, because such numbering is necessarily circular, a positive direction and a negative direction exist with respect to the range of possible sequence numbers.

In the environment discussed previously, the preceding numbering schemes make evident certain advantages provided by embodiments such as those discussed herein. Rather than using the entire range of possible sequence numbers (with the attendant issues involved), sequence information processing module 240 uses the positive portion thereof. As noted, this positive portion is with respect to a current sequence number, which sequence information processing module 240 can maintain in network connection information field 235 of translation table 230 as, for example, a last sequence number (LAST_SEQ_NUM, as noted). As the network communications of a given network connection proceed, sequence information processing module 240 maintains information regarding that network connection, subsequently storing the most recent such information, including the last sequence number (LAST_SEQ_NUM) used in the last outbound network communication sent to the given destination network address using the given external network address. This LAST_SEQ_NUM can then be identified, for example, by the given destination network address and the given external network address, with such identifying information being stored in network connection information field 235. When a given network connection terminates, network connection information field 235 contains LAST_SEQ_NUM and the given destination network address. If another internal client attempts to (re-)use the given external network address in communicating with the external system at the given destination network address, the sequence information stored in network connection information field 235 can be used to identify the given external network address' prior use in communicating with the given destination network address, and provide LAST_SEQ_NUM for use in avoiding sequence number aliasing and the attendant problems caused thereby. In so doing, network device 204 is able to make the given external network address available for use by the other internal client immediately. As will be appreciated in light of the present disclosure, this means that rather than needing to wait, recently-used network addresses (e.g., network addresses used within less than twice an MDL (or about 4 minutes, for TCP/IP connections, as noted)) can still be used immediately (e.g., within less than twice an MDL (or about 4 minutes, for TCP/IP connections, as noted)). An example of the manner in which such processing can be implemented is now presented in connection with FIG. 4.

Figure 4:
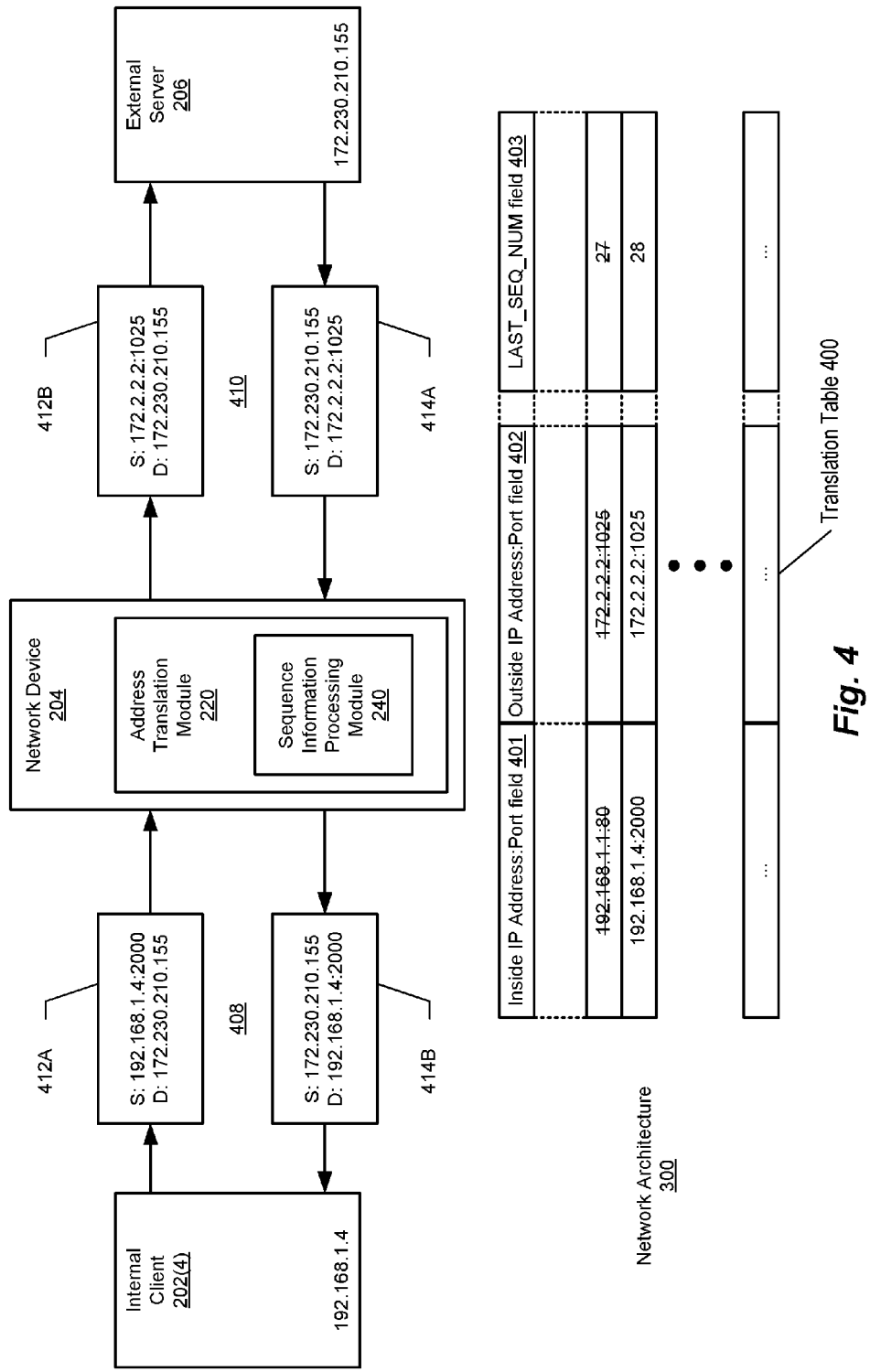
FIG. 4 is a block diagram illustrating an example of a simplified network architecture, according to one embodiment.

FIG. 4 is a block diagram illustrating an example network architecture (depicted in FIG. 4 as before by network architecture 300), and examples of network communications between internal client 202(4) and external server 206, according to one embodiment. As will be appreciated, network architecture 300 is depicted in FIG. 4 at a point in network communications after a connection between internal client 202(1) and external server 206 has been terminated. As before, network device 204 is depicted in FIG. 4 as including address translation module 220, which, in turn, includes sequence information processing module 240. In a manner comparable to that discussed in connection with address translation module 220 in connection with FIG. 2, address translation module 220 maintains a translation table 400. Similar to translation table 230, translation table 400 includes an inside IP Address:Port field 401, an outside IP Address:Port field 402, and a LAST_SEQ_NUM field 403.

As before, internal client 202(4) (now depicted in an internal network 408) and external server 206 (now depicted in an external network 410) are communicatively coupled to network device 204. Also as before, internal client 202(4) is not directly addressable by external server 206 (and so cannot send a network communication addressed to internal client 202(4) directly), while, by contrast, internal client 202(4) is able to send a network communication addressed to external server 206. As noted, a network connection between internal client 202(1) and external server 206 has recently been terminated (the network addresses and sequence information for which can be seen in translation table 400 in strikethrough, reflecting that the aforementioned network connection has been terminated, for purposes of FIG. 4).

In operation, internal client 202(4) generates an outbound network packet 412A that includes a source address (S) of 192.168.1.4:2000 and a destination address (D) of 172.230.210.155. It is noted that outbound network packet 412A can also include various other elements, such as data, error recovery bits, control commands, a sequence number, and other information, which are not shown for clarity's sake. Outbound network packet 412A can be implemented as an Internet Protocol (IP) datagram, such as according to the IPv4 standard. In one implementation, outbound network packet 412A also includes a port number that identifies a network port used by client internal client 202 (here, network port 2000).

Internal client 202(4) can transmit outbound packet 412A to external server 206, for the purpose of, for example, to access a web service or data provided by external server 206. The source address of outbound packet 412A, as noted, is 192.168.1.4:2000, and internal network 208 is implemented using IPv4 (where 192.168.1.4 is the IP address of internal client 202(4) in internal network 408 (and so, private, because such a network address is not addressable from outside internal network 408), and 2000 is the network port used). Outbound packet 412A also includes a destination network address (that of external server 206, 172.230.210.155).

Outbound packet 412A is received at network device 204, at which point, network device 204 generates an outbound packet 412B by replacing the internal source address of outbound packet 412A (192.168.1.4:2000) with an address produced by address translation module 220 (in this, by re-using the outside IP address:port 172.2.2.2:1025). In so doing, the external source network address produced by address translation module 220 is inserted in outbound packet 412B, in place of the original source address originally in outbound packet 412A. The destination address of outbound packet 412A can be used as-is (e.g., as an external destination network address), or can also be modified to produce an address appropriate to external network 410 (e.g., were external network 410 to employ IPv6 addressing or another type of network addressing necessitating such translation), though such operations are not depicted in FIG. 4, for clarity's sake. The external port number can be a number that is assigned dynamically for each internal IP address.

At this juncture, sequence information processing module 240 makes a determination as to whether sequence information processing is needed. In the case presented in FIG. 4, the combination of outside IP address and destination network address have recently been used (by internal client 202(1), as noted), and thus sequence information processing module 240 retrieves the LAST_SEQ_NUM from the entry from this earlier network connection (27, in this example), and processes the sequence number in outbound packet 412A by adjusting (or otherwise modifying) the sequence number therein. Such operations can be accomplished, for example, through the use of a content-addressable memory (CAM). Using a CAM, the outside IP address and the destination network address can be presented, and if an entry is found therein (e.g., as in a lookup table), the LAST_SEQ_NUM stored in the appropriate field of the CAM can be produced. Further, the speed with which such operations can be performed may be further increased through the use of a specialized content-addressable memory, such as a ternary content-addressable memory (TCAM), which would allow for "don't cares," and in so doing, permit network addresses to be more quickly identified by leaving one or more portions of an address as "don't cares." This reduces memory consumption (since some portion of the network addresses are already known, and thus "don't cares") and allows matching network addresses to be more quickly identified (because fewer bits are involved in the searching performed). These and other such alternatives are intended to come within the scope of the present disclosure.

In the example depicted in FIG. 4, outbound packet 412A is a SYN packet, and so the sequence number therein would be of some initial value. In the example depicted in FIG. 4, the initial value of the sequence number is simply 1, though other initial values are possible. Further in this regard, the adjustment made to the sequence number in outbound packet 412A is to add LAST_SEQ_NUM to the sequence number of each such outbound packet. That being the case, the sequence number in the outbound network communication (outbound packet 412A) is extracted, modified appropriately (thus producing a modified sequence number), and inserted in the outbound network communication (outbound packet 412B. In the example depicted in FIG. 4, the sequence number in outbound packet 412B is thus set to 28 (as reflected in the appropriate entry of LAST_SEQ_NUM field 403). As will be appreciated in light of the present disclosure, such an adjustment (or modification) can be implemented in a number of ways, including performing operations to increase the LAST_SEQ_NUM by some percentage (in order to further reduce the likelihood of sequence number aliasing), randomization of the amount of adjustment (to prevent sequence number spoofing), and other such variations). In turn, network device 204 then transmits (e.g., forwards or routes) outbound packet 412B to external server 206. As will also be appreciated in light of the present disclosure, the foregoing operations are transparent to internal client 202(4).

Upon receiving outbound packet 412B, external server 206 performs the requisite processing. In response, external server 206 sends an inbound packet 414A, which is addressed to a destination network address (e.g., D). The destination network address to which inbound packet 414A is addresses is the external source network address used by network device 204 for the given network communication (e.g., 172.2.2.2:1025), which is the external source network address of outbound packet 412B. The source address of inbound packet 414A is the network address of external server 206 (172.230.210.155). Upon receiving inbound packet 414A, network device 204 (and more specifically, address translation module 220) processes the source and destination network addresses therein to generate the internal network address of internal client 402 (and so, converts 172.2.2.2:1025 to 192.168.1.4:2000, in the present example). With respect to the sequence numbers contained in inbound packet 414A, sequence information processing module 240 performs the converse of the operation performed on outbound packet 412A. In the posited case of initialization of the network connection, inbound packet 414A would be (or at least, would be expected to be) a SYN/ACK packet. That being the case, the ACK in inbound packet 414A would be the subject of such converse operations. In the scenario depicted in FIG. 4, this would result, for example, in inbound packet 414B carrying an ACK value of 2 (the ACK value of inbound packet 414A having been 29 in response to the (adjusted) SYN sequence number value of 28), the appropriate value (and that expected by internal client 202(4)). The processed packet can then be transmitted (e.g., forwarded and/or routed) to internal client 202(4) as inbound packet 414B. At the conclusion of such network communications (or termination thereof), as before, translation table 450 (and specifically, the relevant LAST_SEQ_NUM value) is updated to reflect the last sequence number used during such communications. Examples of operations such as those presented above are now discussed in greater detail, in connection with FIGS. 5-9.

Figure 5:
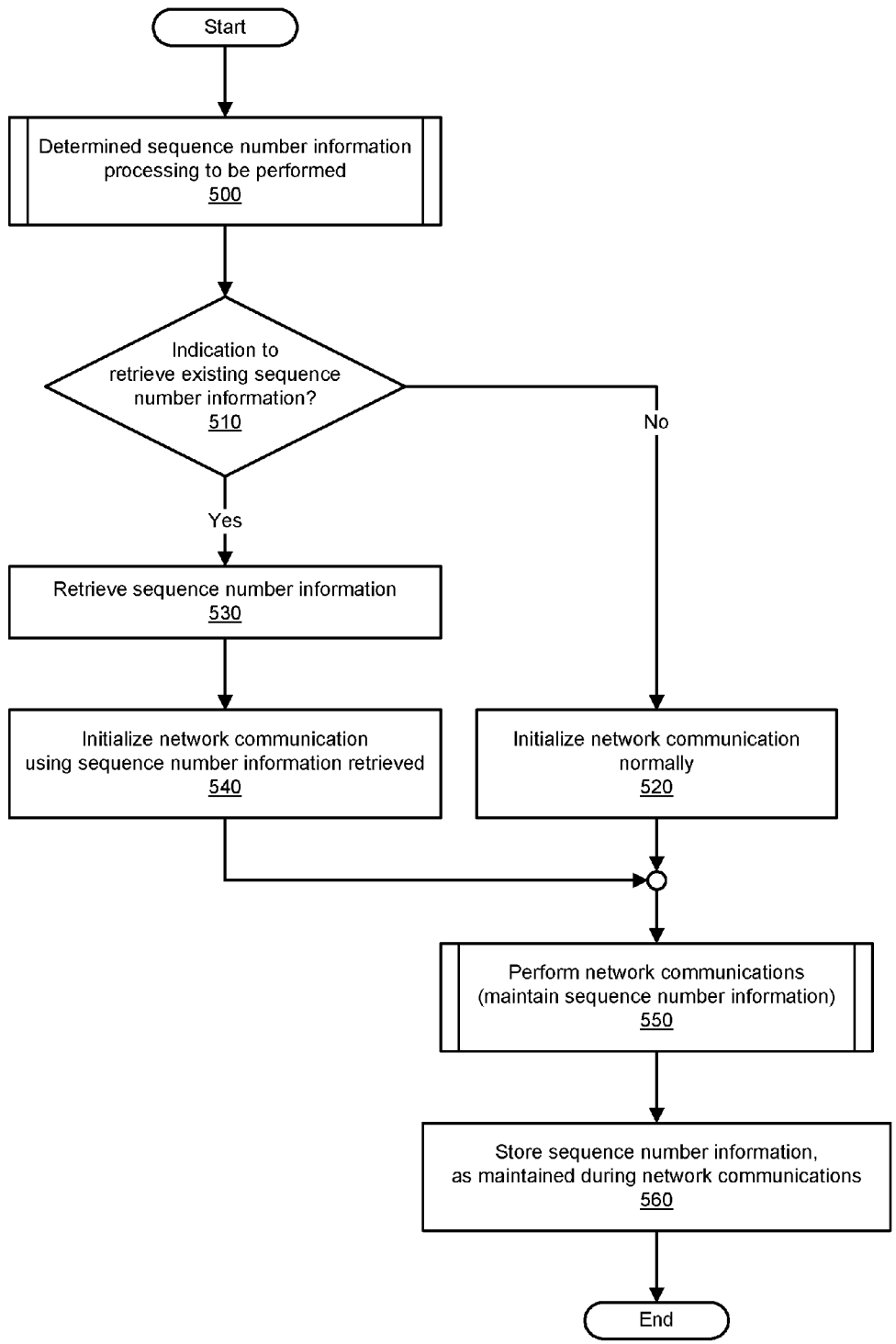
FIG. 5 is a simplified flow diagram illustrating an example of an overall process of sequence number processing, according to one embodiment.

FIG. 5 is a simplified flow diagram illustrating an example of an overall process of sequence number processing, according to one embodiment. As will be appreciated in light of the present disclosure, the process depicted in FIG. 5 is from the perspective of a network device such as network device 110 or network device 204, and begins with a determination as to the sequence number information processing that is to be performed (500). It will be appreciated that such a determination turns on the possibility of "bad packets" being received by the host (internal client) computing system concerned, and the need to avoid such "bad packets" being treated as valid network communications and the problems arising therefrom. An example of such a process is presented in FIG. 6, and a discussion in connection therewith provided subsequently.

A determination as to the sequence number information processing to be performed having been made, a decision is then made as to whether existing sequence information is to be retrieved (510). If no such sequence number information exists in the constructs provided for the maintenance of such information, for such sequence number information processing that is to be performed, the process of FIG. 5 proceeds to initialize the given network communications normally (520). However, if existing sequence number information is to be retrieved (510) such sequence memory information is identified and retrieved (530). Next, the network communications in question are initialized using the sequence number information retrieved (540).

The network communications in question having been initialized appropriately, network communications operations are performed, while maintaining the requisite sequence number information (e.g., in the manner noted in connection with FIGS. 1-4) (550). Once the network communications have been concluded, the sequence number information thus maintained (during network communications) are stored (e.g., in the network device performing a process of FIG. 5) (560). The process then concludes.

Figure 6:
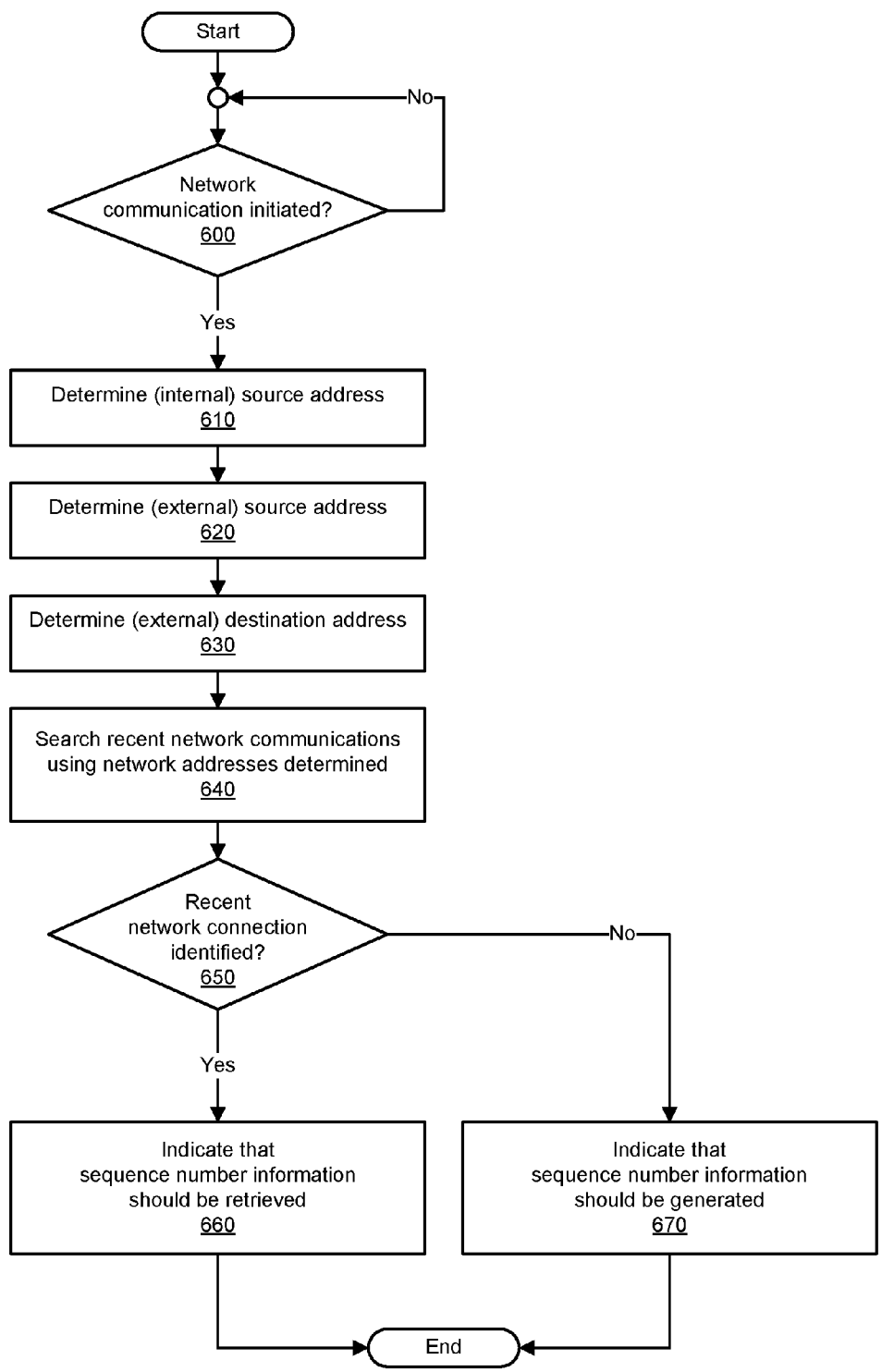
FIG. 6 is a simplified flow diagram illustrating an example of a process for determining the sequence number processing to be performed, according to one embodiment.

FIG. 6 is a simplified flow diagram illustrating an example of a process for determining the sequence number processing to be performed, according to one embodiment. FIG. 6 depicts an example of operations that can be performed in determining what manner of sequence number information processing is to be performed. The process of FIG. 6 begins with a determination as to whether a network communication has been initiated (600). While no such network communication has been initiated (600), the process iterates, awaiting the initiation of a network communication. Upon initiation of a network communication, a determination is made as to the (internal) source address of the host (the internal client computing system's source address) (610). A determination is then made as to the (external) source address, to which the internal source address is to be converted (that being the source address from which the internal client's network communications will appear to be sent) (620). Next, a determination is made as to the (external) destination address, the network address of the destination computing system with which the internal client is attempting to communicate (630). Using the aforementioned network addresses, recent network connections are searched in a recent connections table, in conjunction with the network device's translation table (640). Such a construct (a recent connections table) is described in connection depicted in FIG. 7, subsequently.

A determination is then made as to whether a recent network communication was found in the aforementioned search of recent network connection (650). If a recent network connection has been found, an indication is made to the effect that sequence number information identified in the search of recent network connections should be retrieved (660). Conversely, if no recent network communication is found, an indication is made to the effect that the requisite sequence number information should be generated (and an entry in the recent connections table made) (670). In either case, the process then concludes.

Figure 7:
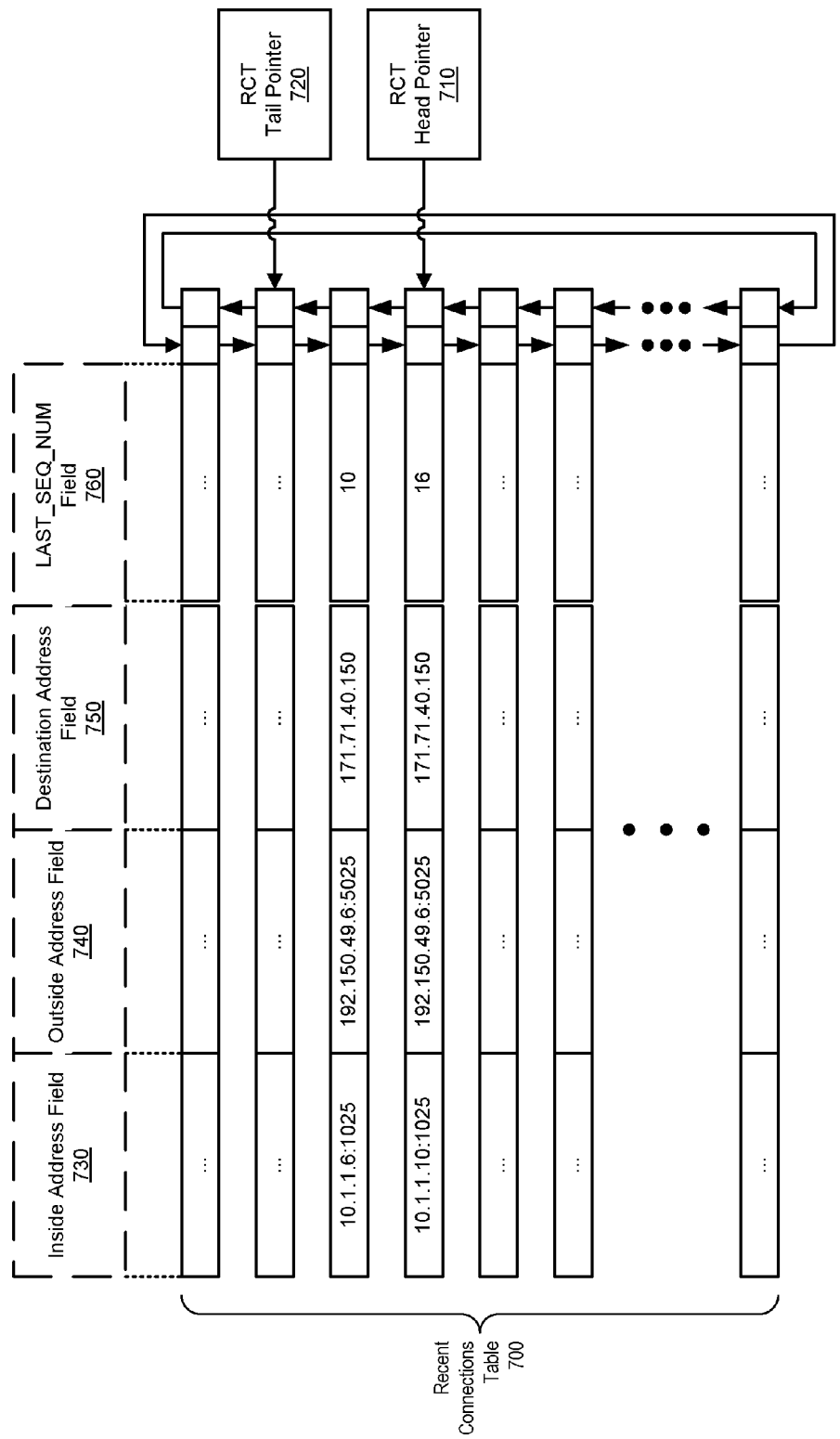
FIG. 7 is a simplified block diagram illustrating an example of a construct for maintaining sequence number information of recent communications, according to one embodiment.

FIG. 7 is a simplified block diagram illustrating an example of a construct for maintaining sequence number information of recent communications, according to one embodiment. The example construct depicted in FIG. 7 is referred to herein as a recent connections table (and is depicted in FIG. 7 as a recent connections table 700). As will be appreciated in light of the present disclosure, recent connections table (RCT) 700 is merely an example of the type of construct and the types of information that can be maintained therein, and can be used to maintain sequence information in the vein of address translation tables 150A, 150B, 230, and 450. That being the case, it will be apparent in light of the present disclosure that other constructs and information can be employed to equally good effect. In FIG. 7, the construct depicted as recent connections table 700 also includes forward and backward pointers, as well as an RCT head pointer 710 and an RCT tail pointer 720.

Recent connections table 700 also includes a variety of information regarding the network communications occurring and tracked by a network device such as network device 110 and network device 404. This information is held in, for example, a number of fields, examples of which are depicted as an inside address field 730, an outside address field 740, a destination address field 750, and a last sequence number field (depicted in FIG. 7 as LAST_SEQ_NUM Field 760). This construct employs a the doubly-linked list that individually identifies the address and sequence number information regarding the recent communications tracked by a network device employing recent connections table 700 (or similar construct). The active contents of recent connections table 700 (i.e., those entries that are recent, and so, have not "aged out," as described below) are maintained using RCT head pointer 710 and RCT tail pointer 720. Thus, in the construct depicted in FIG. 7, sequence number information (e.g., including an inside address, an outside address, a destination address, and a last sequence number) can be maintained for each recent network communication. As a network communication occurs, an entry is made in recent connections table 700 by adding the requisite address information thereto, and incrementing RCT head pointer 710 to point at the new entry. Similarly, as each network communication ages, RCT tail pointer 720 is incremented, and in so doing, "ages out" each network communication as that network communication becomes older than the maximum lifetime for such network communications. In this manner, the construct used to implement recent connections table 700, as depicted in FIG. 7, operates as a circular buffer, as will be further appreciated, the size of the construct used to implement recent connections table 700 will vary with the networking technique employed in the given implementation. For example, in the scenario in which a maximum lifetime is defined by a sequence number range of 431 sequent numbers, a "safe" size for recent connections table 700 will be storage sufficient to maintain information regarding each (overloaded) outside network address for twice the maximum lifetime of a packet or other unit of data within the outside network in question. In this instance, such a size would reflect a maximum lifetime of one minutes, and so a size reflecting a two minute possible lifetime, for each overloaded outside network address, assuming a sequence number range of $2^{31}$ bits. The network addresses and sequence numbers appearing in FIG. 7 are those used in FIG. 9, and thus, the operation of the example presented in connection therewith can be better understood by reference to recent connections table 700.

Figure 8:
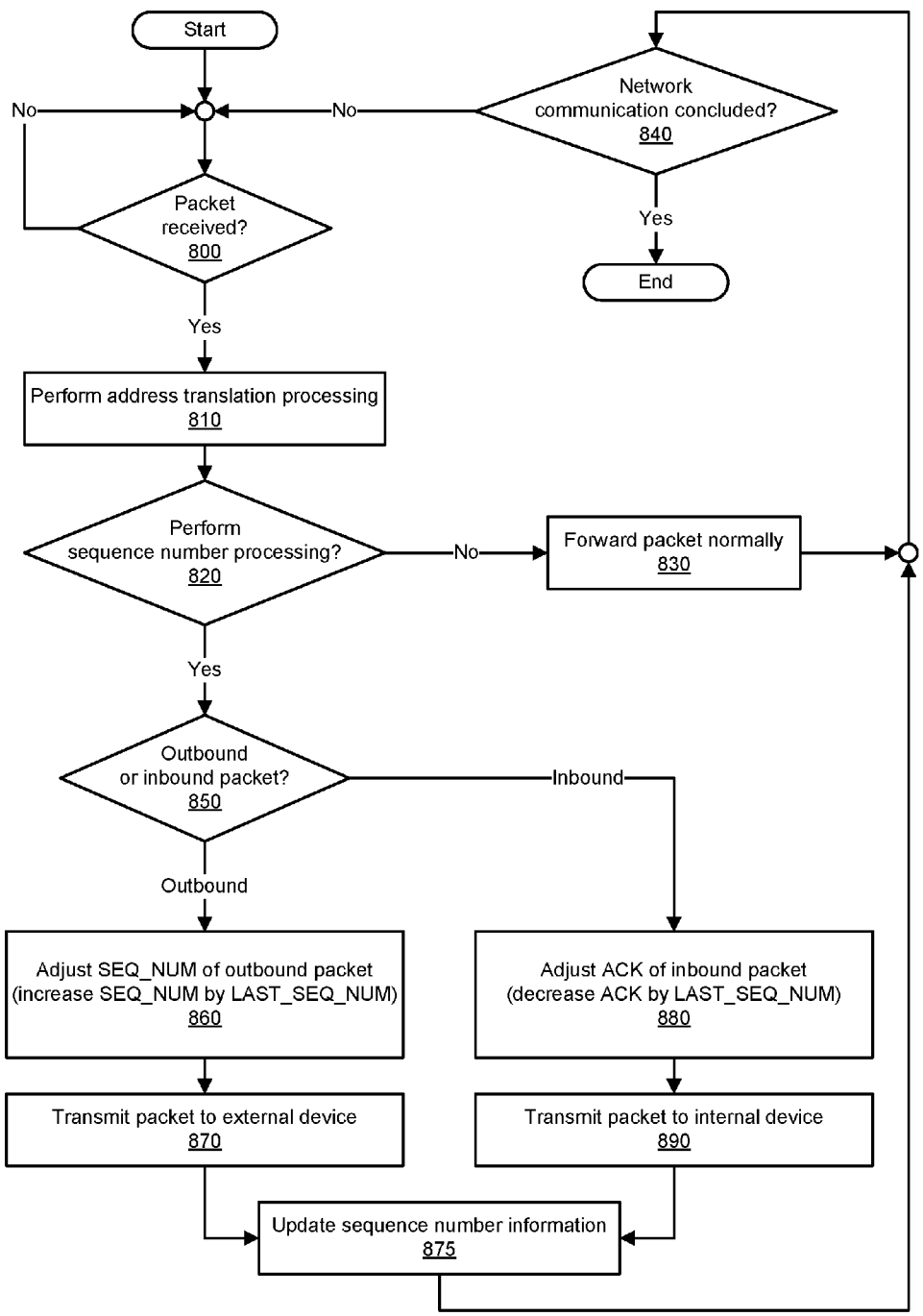
FIG. 8 is a simplified flow diagram illustrating an example of a process for performing network communications that includes the maintenance of sequence number information, according to one embodiment.

FIG. 8 is a simplified flow diagram illustrating an example of a process for performing network communications that includes the maintenance of sequence number information, according to one embodiment. The flow diagram of FIG. 8 thus reflects examples of the operations performed in effecting network communications, while maintaining sequence number information according to embodiments such as those described herein, using the aforementioned TCP/IP protocol environment. The process of FIG. 8 thus begins with a determination as to whether a packet has been received (800). Once a packet (or other unit of data employed by the network communication technique being implemented) has been received, address translation processing is performed by the network device (810). A determination is then made as to whether sequence number processing is to be performed (820). If sequence number information processing is not needed (820), the packet (or other unit of data) is forwarded in the normal course (830). A determination is then made as to whether the network communication in question has concluded (840). If the network communication has concluded, the process of FIG. 8 then itself concludes. Alternatively, if the network communication in question is to continue, the process returned to making a determination as to whether another packet (or unit of data) has been received (800).

In the alternative, if sequence number processing is to be performed (820) a determination is made as to whether the packet (or unit of data) is outbound or inbound with respect to the network device performing the operations depicted in FIG. 8 (850). In the case of an outbound packet (or unit of data), the packet's sequence number SEQ_NUM is adjusted (860). For example, such adjustment to the SEQ_NUM of the outbound packet can take the form of increasing the SEQ_NUM of the outbound packet by the last sequence number (LAST_SEQ_NUM), as retrieved from and/or maintained in a construct such LAST_SEQ_NUM field 760 of recent connections table 700, for example. Having adjusted the SEQ_NUM of the outbound packet, the outbound packet is then transmitted to the external device (870). Having transmitted the outbound packet, the sequence number information maintained as part of the process of FIG. 8 is updated (875). This can take the form of, for example, updating a variable (e.g., CURRENT_SEQ_NUM) for eventual storage as LAST_SEQ_NUM in the appropriate translation table entry. As before, a determination is then made as to whether the network communication in question has concluded (840). Also as before, if the network communication in question has concluded, the process depicted in FIG. 8 itself concludes. Otherwise, the process returns to awaiting the next packet (800).

In the alternative (in the case of an inbound packet) (850), the ACK of the inbound packet is adjusted, and in so doing, for example, the network device decreases the ACK by LAST_SEQ_NUM (880). The ACK of the inbound packet having been adjusted thusly, the inbound packet is transmitted to the intended internal device (890). Having transmitted the outbound packet, the sequence number information maintained as part of the process of FIG. 8 is updated (875). As before, a determination is then made as to whether the network communication in question has concluded (840). If the network communication has concluded, the process depicted in FIG. 8 itself concludes. Alternatively, if the given network communication is to continue, processing returns to awaiting the next packet to be received (800).

Figure 9:
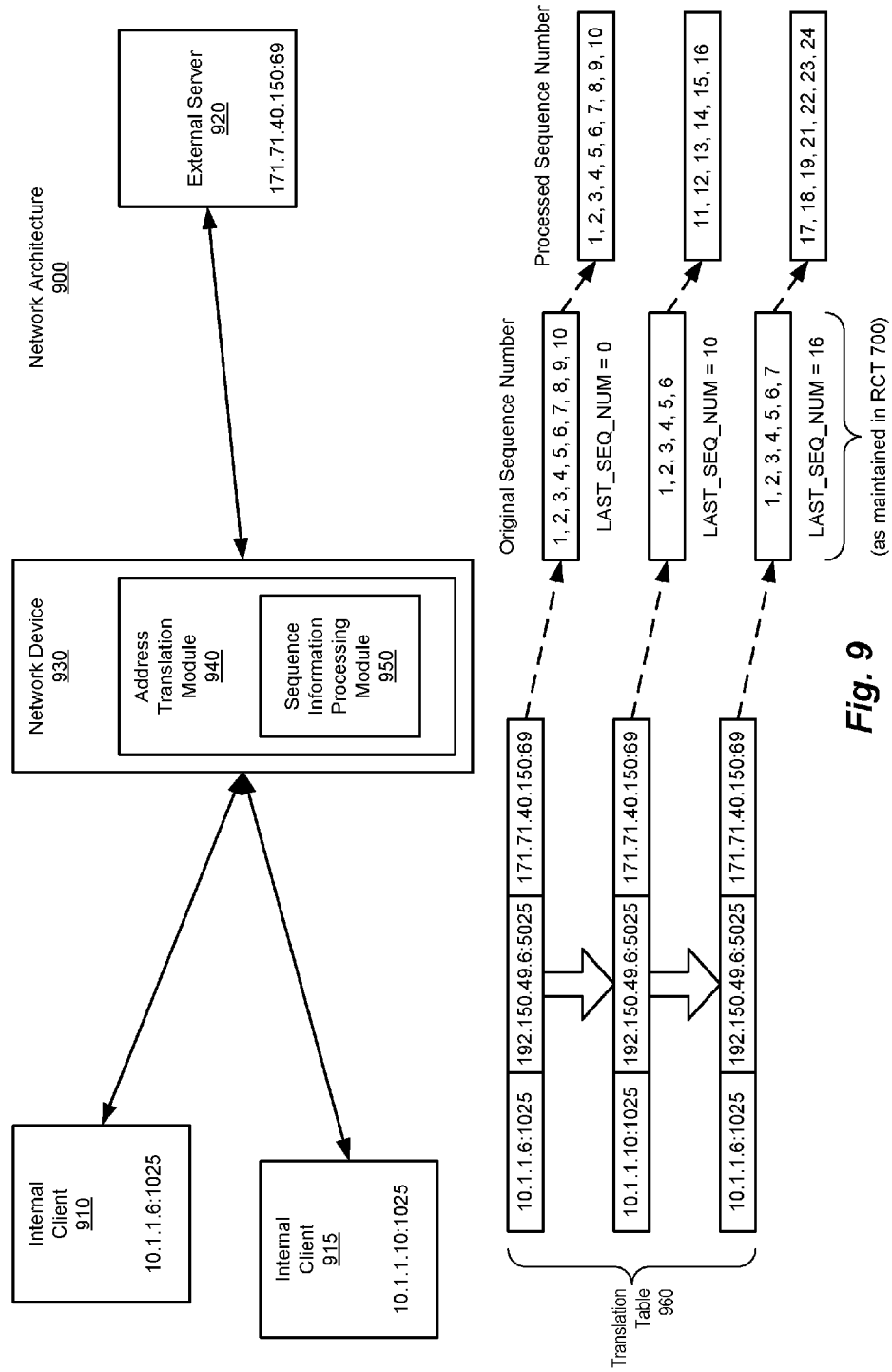
FIG. 9 is a block diagram illustrating an example of a simplified network architecture, according to one embodiment.

FIG. 9 is a block diagram illustrating an example of a simplified network architecture, according to one embodiment. The network architecture of FIG. 9 include internal computer systems (examples of which are depicted in FIG. 9 as internal clients 910 and 915) and an external computer system (depicted in FIG. 9 as an external server 920), which are communicatively coupled to one another by a network device 930. Network device 930, in turn, includes an address translation module 940, which includes a sequenced information processing module 950. Address translation module 940 maintains a translation table 960, which, as depicted in FIG. 9, provides for the translation of addresses in the internal network (e.g., as constituted by internal clients 910 and 915) and network addresses in the external network (e.g., as constituted by external server 920). In employing translation table 960, address translation module 940 can refer to a construct such as recent connections table 700 of FIG. 7, in determining processed sequence numbers (to be used in sending packets to external server 920), which are generated from original sequence numbers received by network device 930 from, for example, internal clients 910 and 915.

As will be appreciated in light of the present disclosure, then, an address employed by network device 930 (e.g., 192.150.49.6:5025) is overloaded by communications from internal clients 910 (10.1.1.6) and internal client 915 (10.1.1.10), which are variously in network communication with external server 920 (e.g., 171.71.40.150:69). As can be seen in FIG. 9, the first network connection in this example is between internal client 910 and external server 902, and comprehends packets with original sequence numbers of: 1, 4,3, 4, 5, 6, 7, 8, 9, and 10. Since this network connection, in the example depicted in FIG. 9, is the first such network communication, the last sequence number is 0 (LAST_SEQ_NUM=0). That being the case, the processed sequence numbers resulting from sequence number information processing performed by sequence information processing module 950 remain essentially unaffected, having remained unprocessed as per the processes described previously (save for any randomization performed). The second network connection is between internal client 915 and external server 520 (with LAST_SEQ_NUM=10, the last sequence number of the prior network communication using 192.150.49.6: 5025), and so begins with a sequence number of 11. As the network communication proceeds, CURRENT_SEQ_NUM for the connection subsequently increases to 16, and upon termination of this connection, is stored as LAST_SEQ_NUM (and so, at this juncture, LAST_SEQ_NUM=16). At this point, the next network communication (between internal client 910 and external server 920) commences. In comparable fashion, the original sequence numbers of: 1, 4, 3, 4, 5, 6, and 7, are adjusted and appear as processed sequence numbers (17, 18, 19, 20, 21, 22, 23, and 24), having been adjusted by LAST_SEQ_NUM (16). In the manner noted earlier, it will be appreciated that the value stored in LAST_SEQ_NUM and/or CURRENT_SEQ_NUM can be randomized in the positive direction (so long as a "positive" value is maintained, with respect thereto), in order to prevent spoofing.

An Example Computing and Network Environment

As shown above, the systems described herein can be implemented using a variety of computer systems and networks. Examples of such computing and network environments are described below with reference to FIGS. 10 and 11.

Figure 10:
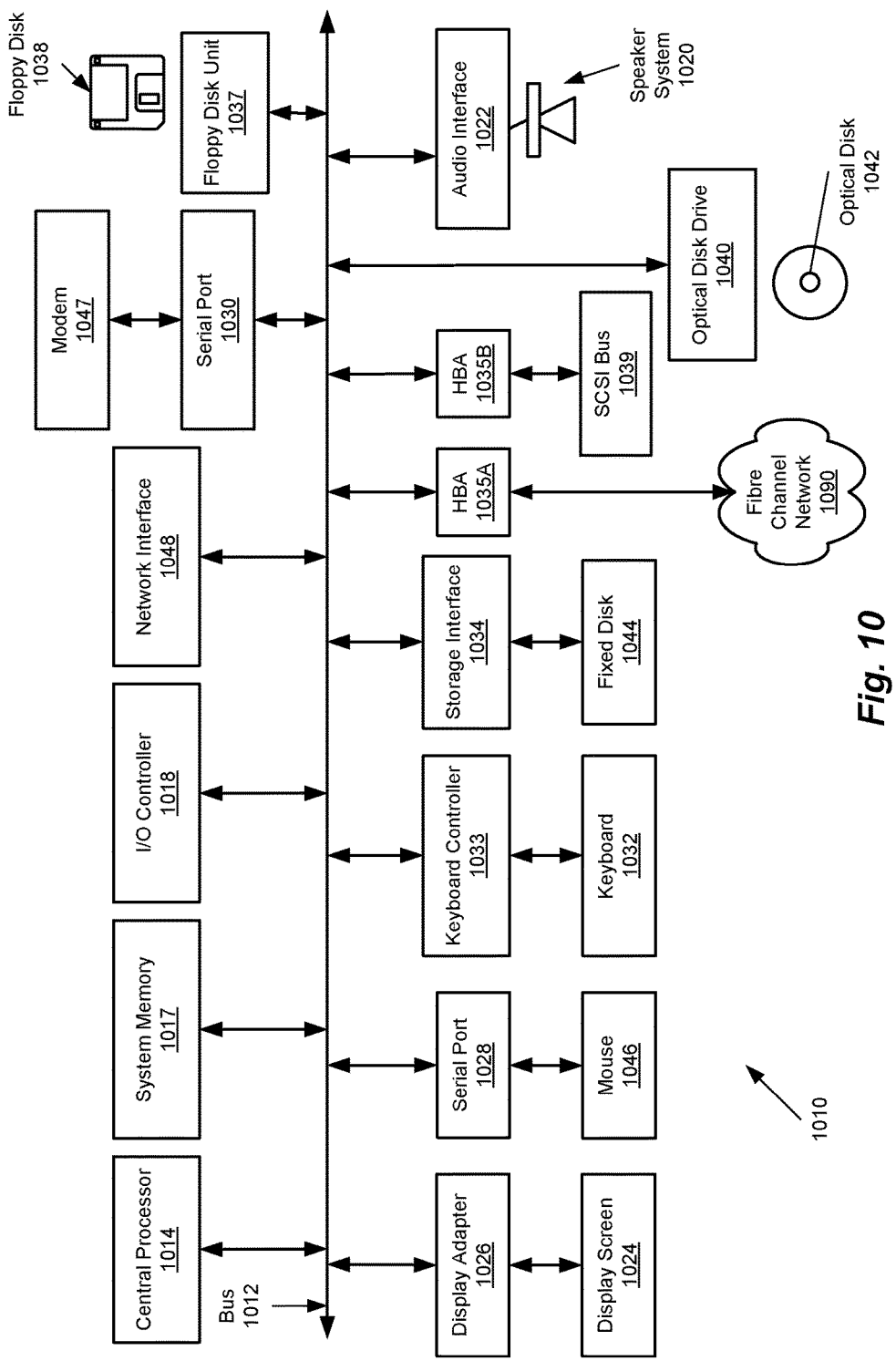
FIG. 10 is a simplified block diagram illustrating components of an example computer system, which can be used in the implementation of embodiments such as those described herein.

FIG. 10 depicts a block diagram of a computer system 1010 suitable for implementing aspects of the systems described herein, and the like. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows a network communication between central processor 1014 and system memory 1017, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1010 are generally stored on and accessed from a computer-readable storage medium, such as a hard disk drive (e.g., fixed disk 1044), an optical drive (e.g., optical drive 1040), a floppy disk unit 1037, or other computer-readable storage medium.

Storage interface 1034, as with the other storage interfaces of computer system 1010, can connect to a standard computer-readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the systems described herein. The devices and subsystems can be interconnected in different ways from that shown in FIG. 10. The operation of a computer system such as that shown in FIG. 10 is readily known in the art and is not discussed in detail in this application. Code to implement the modules of the systems described herein can be stored in computer-readable storage media such as one or more of system memory 1017, fixed disk 1044, optical disk 1042, or floppy disk 1038. The operating system provided on computer system 1010 may be MS-WINDOWS®, UNIX®, Linux®, or other operating system.

Further, and as will be appreciated in light of the present disclosure, each of the operations described herein may be executed by a module (e.g., a software module) or a portion of a module, or a computer system user. Thus, the above-described method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module.

The software modules described herein may be received by a computer system, for example, from computer-readable storage media. Such computer readable storage media may be permanently, removably or remotely coupled to the computer system. Computer-readable storage media may non-exclusively include, for example, any number of the following: magnetic storage media (including disk and tape storage media); optical storage media such as compact disk media (e.g., CD ROM, CD R, etc.) and digital video disk storage media; nonvolatile memory storage memory including semiconductor-based memory units such as FLASH memory, EEPROM, EPROM, ROM or application specific integrated circuits; and volatile storage media (including registers, buffers or caches, main memory, RAM, etc.). In a UNIX-based embodiment, the software modules may be embodied in a file, which may be a device, a terminal, a local or remote file, a socket, or other such element. Other new and various types of computer-readable storage media may also be used to store the software modules discussed herein.

Many other devices or subsystems (not shown) may be connected in a similar manner (e.g., bar code readers, document scanners, digital cameras and so on). Conversely, it is not necessary for all of the devices shown in FIG. 10 to be present to practice the present invention. The devices and subsystems may be interconnected in different ways from that shown in FIG. 10. The operation of a computer system such as that shown in FIG. 10 is readily known in the art and is not discussed in detail in this application. Code to implement the present invention may be stored in computer-readable storage media such as one or more of system memory 1016, fixed disk 1044, CD-ROM 1042, or floppy disk 1038. Additionally, computer system 1010 may be any kind of computing device, and so includes personal data assistants (PDAs), network appliance, X-window terminal or other such computing device. Computer system 1010 also supports a number of Internet access tools, including, for example, an HTTP-compliant web browser having a JavaScript interpreter, such as Netscape Navigator®, Microsoft Internet Explorer® and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 11:
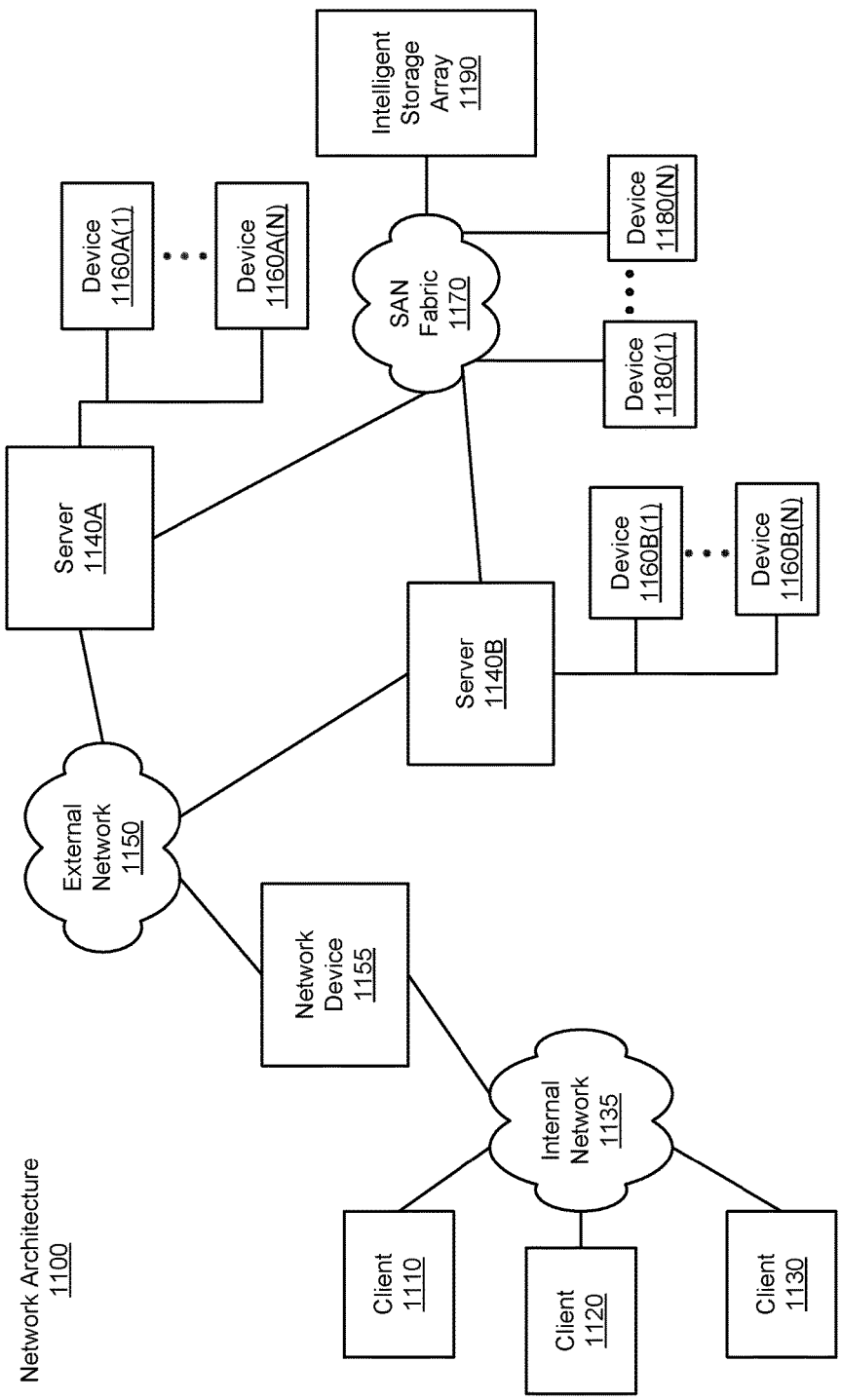
FIG. 11 is a simplified block diagram of a network architecture, in which embodiments such as those described herein can be implemented.

FIG. 11 is a block diagram depicting a network architecture 1100 in which client computer systems 1110, 1120 and 1130 are coupled to one another by an internal network 1135, as well as storage servers 1140A and 1140B (any of which can be implemented using computer system 1110), are coupled to an external network 1150. Internal network 1135 and external network 1150 are communicatively coupled to one another, in turn, by a network device 1155, in the manner of network device 110 and/or network device 404.

Storage server 1140A is further depicted as having storage devices 1160A(1)-(N) directly attached, and storage server 1140B is depicted with storage devices 1160B(1)-(N) directly attached. Storage servers 1140A and 1140B are also connected to a SAN fabric 1170, although connection to a storage area network is not required for operation. SAN fabric 1170 supports access to storage devices 1180(1)-(N) by storage servers 1140A and 1140B, and so by client systems 1110, 1120 and 1130 via external network 1150. Intelligent storage array 1190 is also shown as an example of a specific storage device accessible via SAN fabric 1170.

With reference to computer system 1010, modem 1047, network interface 1048 or some other method can be used to provide connectivity from each of client computer systems 1110, 1120 and 1130 to external network 1150. Client systems 1110, 1120 and 1130 are able to access information on storage server 1140A or 1140B using, for example, a web browser or other client software (not shown). Such a client allows client systems 1110, 1120 and 1130 to access data hosted by storage server 1140A or 1140B or one of storage devices 1160A(1)-(N), 1160B(1)-(N), 1180(1)-(N) or intelligent storage array 1190. FIG. 18 depicts the use of a network such as the Internet for exchanging data, but the systems described herein are not limited to the Internet or any particular network-based environment.

The foregoing described embodiments wherein the different components are contained within different other components (e.g., the various elements shown as components of computer system 1010, discussed subsequently). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Example Networking Device

As shown above, the present disclosure can be implemented using a variety of computer systems and networks. An example of one such computing environment is described below with reference to FIG. 12.

Figure 12:
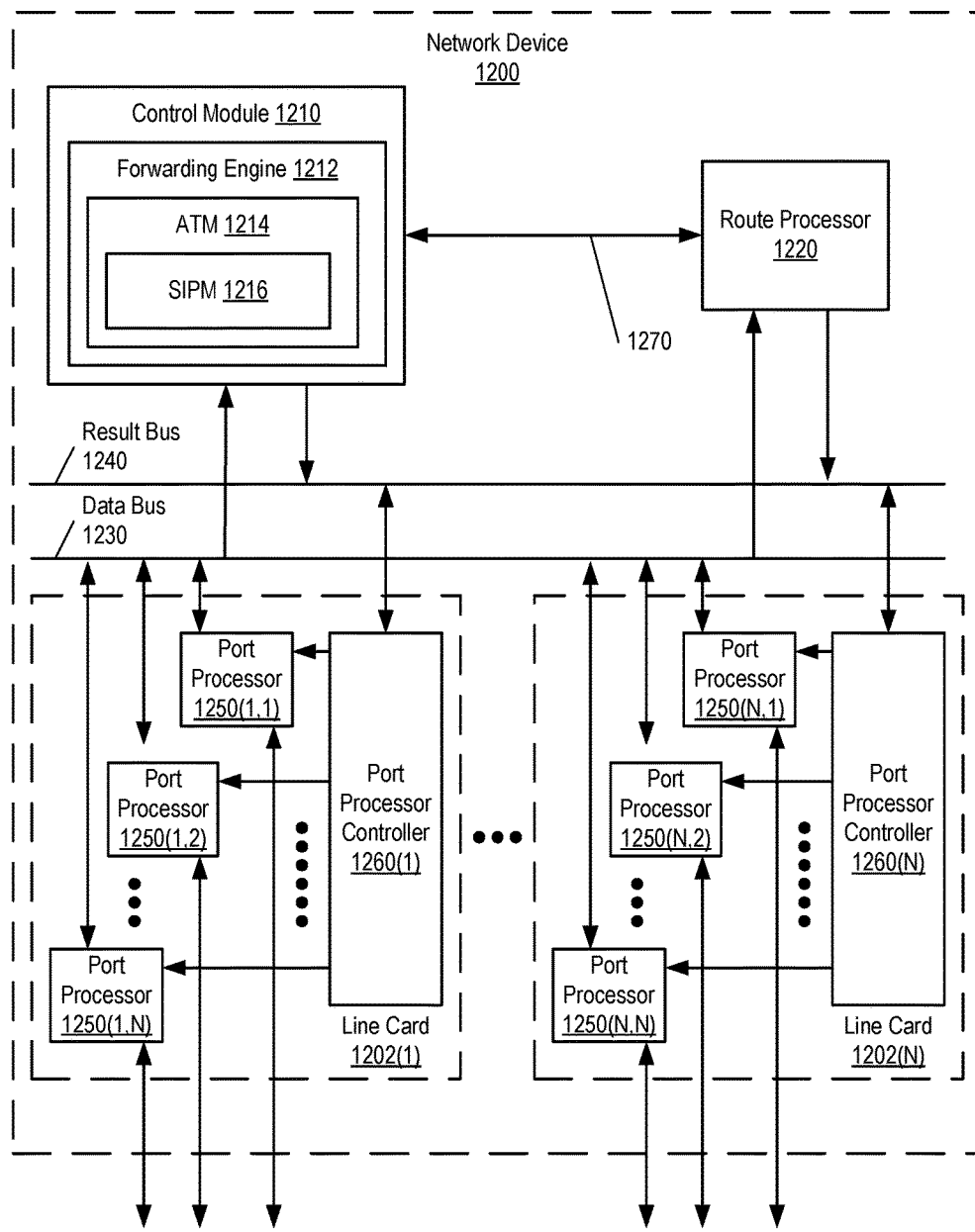
FIG. 12 is a block diagram illustrating components of an example networking device, which can be used in the implementation of embodiments such as those described herein.

FIG. 12 is a block diagram illustrating components of an example networking device 1200, which depicts (at least in part) one configuration of a network device or a network routing element (e.g., a hub, router, switch, or similar device). In this depiction, networking device 1200 includes a number of line cards (line cards 1202(1)-1202(N)) that are communicatively coupled to a control module 1210 (which can include a forwarding engine, such as forwarding engine 1212). Forwarding engine 1212, in turn, can include an address translation module (ATM) 1214, such as the address translation modules discussed previously. In order to support the immediate re-use of network addresses, address translation module 1214 includes a sequence information processing module (SIPM) 1216, which provides functionalities such as those described earlier in this regard. As noted earlier, ATM 1214 or SIPM 1216 can, in turn, include (and/or otherwise employ) one or more content-addressable memories (CAMs) and/or ternary CAMs (TCAMs) in the identification of network connections, in the manner discussed in connection with FIG. 4, for example.

Networking device 1200 is also depicted as including a traffic control (or flow control) processor (depicted as a route processor 1220), to which line cards 1202(1)-1202(N) are also coupled. Line 1202(1)-1202(N) are coupled to control module 1210 and route processor 1220 via a data bus 1230 and a result bus 1240. Line cards 1202(1)-(N) include a number of port processors 1250(1,1)-1250(N,N) which are controlled by port processor controllers 1260(1)-1260(N). It will also be noted that control module 1210 and route processor 1220 are not only coupled to one another via data bus 1230 and result bus 1240, but are also communicatively coupled to one another by a communications link 1270. It is noted that in alternative embodiments, each line card can include its own forwarding engine.

When a message (e.g., an authorization request, a commissioning certificate, or a commissioning complete confirmation message) is received by a network device or network routing element such as networking device 1200, the message is identified and analyzed in the following manner. Upon receipt, a message (or some or all of its control information) is sent from one of the port processors 1250(1,1)-1250(N,N) at which the message was received to one or more of those devices coupled to data bus 1230 (e.g., others of port processors 1250(1,1)-1250(N,N), a forwarding engine, and/or route processor 1220). Handling of the message can be performance, for example, by a forwarding engine in accordance with the systems and methods disclosed herein. For example, a forwarding engine may determine that the message should be forwarded to one or more of port processors 1250(1,1)-1250(N,N). This can be accomplished by indicating to a corresponding one(s) of port processor controllers 1260(1)-1260(N) that the copy of the message held in the given one(s) of port processors 1250(1,1)-1250(N,N) should be forwarded to the appropriate one of port processors 1250(1,1)-1250(N,N).

Networking device 1200 can be used, for example, in the implementation of a network device or a network routing element in control module 1210, or in one or more of port processor controllers 1260(1)-1260(N) and/or in route processor 1220, in order to implement the present disclosure. Although not shown, network device 1200 can also be used to implement a routing protocol module (not shown) and/or network reachability protocol module (not shown) in control module 1210, in one of port processor controllers 1260(1)-1260(N), and/or in route processor 1220.

An incoming message (e.g., an authorization request, a commissioning certificate, or a commissioning complete confirmation message) can be provided to a network device or network routing element via a forwarding engine or port processor of a line card coupled to a port that received the incoming message. Network device 1200 can be configured to process the incoming message and to generate one or more outgoing messages (e.g., an authorization request, a commissioning certificate, or a commissioning complete confirmation message), as described throughout this disclosure.

The outgoing message can be provided to a forwarding engine by a network device or a network routing device, which can determine that the outgoing message should be forwarded to one or more of port processors 1250(1,1)-1250(N,N) that are configured to transmit the outgoing message toward the outgoing message's destination. As noted with regard to other systems described herein, networking device 1200 includes one or more processors 502 (e.g., microprocessors, PLDs (Programmable Logic Devices), or ASICs (Application Specific Integrated Circuits)) configured to execute program instructions stored in computer readable storage media of various types, including RAM (Random Access Memory), ROM (Read Only Memory), Flash memory, MEMS (Micro Electro-Mechanical Systems) memory, and the like.

Other Embodiments

The systems described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing detailed description has set forth various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the systems described herein have been described in connection with several embodiments, these embodiments and their descriptions are not intended to be limited to the specific forms set forth herein. On the contrary, it is intended that such embodiments address such alternatives, modifications, and equivalents as can be reasonably included within the scope of the appended claims.

What is claimed is:

1. A method comprising:
receiving a network communication from a source device, wherein
the network communication is received at a network device, and
the network communication comprises a sequence number;
determining whether the sequence number is to be modified;
in response to a determination that the sequence number is to be modified,
extracting the sequence number from the network communication,
modifying, by a processor of the network device, the sequence number, wherein
the modifying produces a modified sequence number based, at least in part, on another sequence number of a recent network connection, and
the recent network connection used an external source network address of the network device, and
inserting the modified sequence number in the network communication, in place of the sequence number, wherein
the inserting the modified sequence number in the network communication produces a modified network communication; and
transmitting the modified network communication to a destination device, wherein
the modified network communication is transmitted from the network device using the external source network address, as part of a network connection.

2. The method of claim 1, wherein the determining further comprises:
determining the external source network address; and
determining an external destination network address, wherein
the external network destination address is a network address of the destination device.

3. The method of claim 2, wherein the determining further comprises:
searching a recent connections table for information regarding the recent network connection, wherein
the searching uses the external source network address and the external network destination address.

4. The method of claim 3, further comprising:
in response to the information regarding the recent network connection being found in the recent connections table, retrieving a last sequence number from an entry in the recent connections table corresponding to the recent network connection.

5. The method of claim 4, wherein
the sequence number is modified using the last sequence number, and
the another sequence number is the last sequence number.

6. The method of claim 3, further comprising:
in response to the recent network connection not being found in the recent connections table, creating an entry in the recent connections table corresponding to the recent network connection.

7. The method of claim 2, wherein the determining whether the sequence number is to be modified is performed using a content-addressable memory.

8. The method of claim 1, further comprising:
performing an address translation from an internal source network address to the external source network address, wherein
the internal source network address is a network address of the source device,
the source device is in an internal network,
the external network source address is a network address that is addressable in an external network, and
the destination device is in the external network.

9. The method of claim 8, wherein
the determining further comprises
determining the external source network address, and
determining an external destination network address, wherein
the external network destination address is a network address of the destination device, and
further comprising
searching a recent connections table for information regarding the recent network connection, wherein
the searching uses the external source network address and the external network destination address.

10. The method of claim 9, further comprising:
in response to the information regarding the recent network connection being found in the recent connections table, retrieving a last sequence number from an entry in the recent connections table corresponding to the recent network connection, wherein
the another sequence number is the last sequence number, and
the sequence number is modified using the last sequence number.

11. The method of claim 1, further comprising:
searching a recent connections table for information regarding the recent network connection, wherein
the searching uses the external source network address and an external network destination address,
the destination device is in an external network, the external network source address is a network address that is addressable in the external network, and the external network destination address is a network address of the destination device.

12. The method of claim 11, further comprising:

performing an address translation from an internal source network address to the external source network address, wherein the source device is in an internal network, and the internal source network address is a network address of the source device.

13. The method of claim 12, further comprising:

in response to the information regarding the recent network connection being found in the recent connections table, retrieving a last sequence number from an entry in the recent connections table corresponding to the recent network connection, wherein the another sequence number is the last sequence number, and the sequence number is modified using the last sequence number, and the information regarding the recent network connection being found in the recent connections table indicates that the external source network address is overloaded.

14. A network device comprising:

one or more processors;

a first network interface, coupled to the one or more processors;

a second network interface, coupled to the one or more processors;

a computer-readable storage medium, coupled to the one or more processors; and a plurality of instructions, encoded in the computer-readable storage medium and configured to cause the one or more processors to receive a network communication from a source device at the first network interface, wherein the network communication comprises a sequence number, determine whether the sequence number is to be modified, in response to a determination that the sequence number is to be modified, extract the sequence number from the network communication, produce a modified sequence number by modifying the sequence number based, at least in part, on another sequence number of a recent network connection, wherein the recent network connection used an external source network address of the network device, and insert the modified sequence number in the network communication, in place of the sequence number, to produce a modified network communication, and transmit the modified network communication to a destination device, wherein the modified network communication is transmitted from the second network interface using the external source network address, as part of a network connection.

15. The network device of claim 14, further comprising:

a sequence information processing module, wherein the sequence information processing module is coupled to the one or more processors, and the sequence information processing module is configured to modify the sequence number to produce the modified sequence number.

16. The network device of claim 15, further comprising:

a recent connections table, wherein the sequence information processing module is communicatively coupled to the recent connections table, and the recent connections table comprises an outside address field, a destination address field, and a last sequence number field.

17. The network device of claim 16, further comprising:

the outside address field is configured to store the external source network address, the destination address field is configured to store an external destination network address, and the external network destination address is a network address of the destination device.

18. The network device of claim 16, further comprising:

a content-addressable memory, coupled to the sequence information processing module to maintain the recent connections table.

19. The network device of claim 14, further comprising:

a translation table;

an address translation module, wherein the address translation module is coupled to the one or more processors, the first network interface, the second network interface, and the translation table, and the address translation module is configured to translate an inside address in the network communication to an outside address;

a recent connections table; and a sequence information processing module, wherein the sequence information processing module is communicatively coupled to the recent connections table, the sequence information processing module is coupled to the address translation module, and the sequence information processing module is configured to modify the sequence number to produce the modified sequence number.

20. A computer program product comprising:

a plurality of instructions, comprising a first set of instructions, executable on a network device, configured to receive a network communication from a source device at a first network interface of the network device, wherein the network communication comprises a sequence number, a second set of instructions, executable on the network device, configured to determine whether the sequence number is to be modified, a third set of instructions, executable on the network device, configured to, in response to a determination that the sequence number is to be modified, extract the sequence number from the network communication, modify the sequence number to produce a modified sequence number based, at least in part, on another sequence number of a recent network connection, wherein the recent network connection used an external source network address of the network device, and insert the modified sequence number in the network communication, in place of the sequence number, to produce a modified network communication, and a fourth set of instructions, executable on the network device, configured to transmit the modified network communication to a destination device, wherein the modified network communication is transmitted from a second network interface of the network device using the external source network address, as part of a network connection; and a computer-readable storage medium, wherein the instructions are encoded in the computer-readable storage medium.

* * * * *